United States Patent
Goldberg et al.

(10) Patent No.: US 6,264,560 B1
(45) Date of Patent: *Jul. 24, 2001

(54) METHOD AND SYSTEM FOR PLAYING GAMES ON A NETWORK

(75) Inventors: Sheldon F. Goldberg, 3360 E. Serene, Henderson, NV (US) 89014; John Van Antwerp, Pittsfield, IL (US)

(73) Assignee: Sheldon F. Goldberg, Henderson, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,979

(22) Filed: Aug. 27, 1998

Related U.S. Application Data

(63) Continuation-in-part of application No. 09/105,401, filed on Jun. 26, 1998, which is a continuation of application No. 08/759,895, filed on Dec. 3, 1996, now Pat. No. 5,823,879.
(60) Provisional application No. 60/058,006, filed on Aug. 27, 1997, provisional application No. 60/010,703, filed on Jan. 26, 1996, and provisional application No. 60/010,361, filed on Jan. 19, 1996.

(51) Int. Cl.⁷ ........................................................ A63F 9/24
(52) U.S. Cl. ............................................................. 463/42
(58) Field of Search ................................ 463/26, 27, 42, 463/11, 12, 13, 7, 31, 35; 273/236, 237, 454

(56) References Cited

U.S. PATENT DOCUMENTS

| | | |
|---|---|---|
| 3,796,433 | 3/1974 | Fraley et al. . |
| 4,283,709 | 8/1981 | Lucero et al. .................. 340/147 |
| 4,339,798 | 7/1982 | Hedges et al. .................. 364/412 |

(List continued on next page.)

FOREIGN PATENT DOCUMENTS

| | | | |
|---|---|---|---|
| 2 183 882 | 6/1987 | (GB) | ............................ G07F/17/34 |
| 2 205 188 | 11/1988 | (GB) | ............................ G07F/17/34 |

OTHER PUBLICATIONS

Advertising brochure for "Trak–21", by Digital Biometics, Inc., Gaming Division, 5600 Rowland road, Minnetonka, MN 55343.

U.S. Patent Application: Auxier et al., "Interactive Information Super Highway Prize Network", Sep. 2, 1994.

Advertising page for "tracker–Plus TP–700 Player Tracking Equioment for Table Games", by Open Technologies, 6520 Platt Ave., Suite 672, West Hills, CA 91307.

(List continued on next page.)

*Primary Examiner*—George Manual
(74) *Attorney, Agent, or Firm*—Sheridan Ross P.C.

(57) ABSTRACT

The present invention is a game playing method and apparatus for automating games such as blackjack, poker, craps, roulette, baccarat and pai gow, wherein players may play continuously and asynchronously, and information related to advertised items can be exchanged between players and advertisers. In one embodiment, each instance of a game is likely unique from all other current game instances. The games do not require a manual dealer and in one embodiment, played in a gaming establishment using low cost gaming stations. The present invention may also be used to play such games on the Internet or an interactive cable television network wherein a game controller communicates with players at network nodes in their homes and at their leisure since there is no game tempo requirement. During a game, advertising is selectively provided by comparing player personal information with a desired demographic profile. Player responses to advertising are used for evaluating advertising effectiveness. The invention is useful for test marketing of products, advertisements, and reduces advertising costs.

105 Claims, 14 Drawing Sheets

U.S. PATENT DOCUMENTS

| | | | |
|---|---|---|---|
| 4,355,806 | * 10/1982 | Buck et al. | 463/7 |
| 4,467,424 | 8/1984 | Hedges et al. | 364/412 |
| 4,494,197 | 1/1985 | Troy et al. | 364/412 |
| 4,528,643 | 7/1985 | Freeny, Jr. | 364/900 |
| 4,531,187 | 7/1985 | Uhland | 364/412 |
| 4,614,342 | 9/1986 | Takashima | 273/85 |
| 4,636,951 | 1/1987 | Harlick | 364/412 |
| 4,760,527 | 7/1988 | Sidley | 364/412 |
| 4,842,275 | 6/1989 | Tsatskin | 273/1 R |
| 4,845,739 | 7/1989 | Katz | 379/92 |
| 4,875,164 | 10/1989 | Monfort | 364/412 |
| 4,902,020 | 2/1990 | Auxier | 273/256 |
| 4,926,327 | 5/1990 | Sidley | 364/412 |
| 5,009,429 | 4/1991 | Auxier | 273/240 |
| 5,034,807 | 7/1991 | Von Kohorn | 358/84 |
| 5,038,022 | 8/1991 | Lucero | 235/380 |
| 5,057,915 | 10/1991 | Von Kohorn | 358/84 |
| 5,073,931 | 12/1991 | Audebert et al. | 380/23 |
| 5,083,271 | 1/1992 | Thacher et al. . | |
| 5,141,234 | 8/1992 | Boylan et al. . | |
| 5,159,549 | 10/1992 | Hallman, Jr. et al. | 364/412 |
| 5,224,706 | 7/1993 | Bridgeman et al. | 273/85 |
| 5,227,874 | 7/1993 | Von Kohorn | 358/84 |
| 5,257,789 | 11/1993 | LeVasseur | 273/309 |
| 5,257,810 | 11/1993 | Schorr et al. | 273/292 |
| 5,320,356 | 6/1994 | Cauda | 273/292 |
| 5,321,241 | 6/1994 | Craine | 235/380 |
| 5,326,104 | 7/1994 | Pease et al. | 273/292 |
| 5,343,239 | 8/1994 | Lappington et al. | 348/12 |
| 5,351,970 | 10/1994 | Fioretti | 273/439 |
| 5,393,067 | 2/1995 | Paulsen et al. | 273/292 |
| 5,398,932 | 3/1995 | Eberhardt et al. | 273/138 A |
| 5,403,015 | 4/1995 | Forte et al. | 273/304 |
| 5,429,361 | 7/1995 | Raven et al. | 273/138 A |
| 5,431,407 | 7/1995 | Hofberg et al. | 273/292 |
| 5,437,462 | 8/1995 | Breeding | 273/292 |
| 5,505,449 | 4/1996 | Eberhardt et al. | 273/138 A |
| 5,507,491 | 4/1996 | Gatto et al. | 273/139 |
| 5,508,731 | 4/1996 | Kohorn | 348/1 |
| 5,526,035 | 6/1996 | Lappington et al. | 348/13 |
| 5,539,450 | 7/1996 | Handelman | 348/12 |
| 5,539,822 | 7/1996 | Lett | 380/20 |
| 5,544,892 | 8/1996 | Breeding | 273/292 |
| 5,549,300 | 8/1996 | Sardarian | 273/292 |
| 5,559,312 | 9/1996 | Lucero | 235/380 |
| 5,561,707 | 10/1996 | Katz | 379/88 |
| 5,569,082 | 10/1996 | Kaye | 463/17 |
| 5,586,257 | 12/1996 | Perlman | 463/42 |
| 5,586,766 | 12/1996 | Forte et al. | 273/309 |
| 5,592,212 | 1/1997 | Handelman | 348/12 |
| 5,593,349 | 1/1997 | Miguel et al. | 463/30 |
| 5,597,162 | 1/1997 | Franklin | 273/292 |
| 5,603,502 | 2/1997 | Nakagawa | 273/292 |
| 5,611,730 | 3/1997 | Weiss | 463/20 |
| 5,613,912 | 3/1997 | Slater | 463/25 |
| 5,643,088 | 7/1997 | Vaughn et al. | 463/40 |
| 5,660,391 | 8/1997 | Klasee | 273/292 |
| 5,669,817 | 9/1997 | Tarantino | 463/13 |
| 5,688,174 | 11/1997 | Kennedy | 463/37 |
| 5,697,844 | 12/1997 | Von Kohorn | 463/40 |
| 5,702,104 | 12/1997 | Malke et al. | 273/292 |
| 5,702,305 | 12/1997 | Norman et al. | 463/42 |
| 5,709,603 | 1/1998 | Kaye | 463/17 |
| 5,711,715 | 1/1998 | Ringo et al. | 473/9 |
| 5,713,795 | 2/1998 | Kohorn | 463/17 |
| 5,716,574 | 2/1998 | Hughes | 273/292 |
| 5,718,431 | 2/1998 | Ornstein | 273/292 |
| 5,724,425 | 3/1998 | Chang et al. | 380/25 |
| 5,729,212 | 3/1998 | Martin | 340/870.28 |
| 5,732,949 | 3/1998 | Josephs | 273/292 |
| 5,735,525 | 4/1998 | McCrea, Jr. | 273/309 |
| 5,735,742 | 4/1998 | French | 463/25 |
| 5,740,549 | 4/1998 | Reilly et al. | 705/14 |
| 5,746,656 | 5/1998 | Bezick et al. | 463/42 |
| 5,748,742 | 5/1998 | Tisdale et al. | 380/49 |
| 5,749,785 | 5/1998 | Rossides | 463/25 |
| 5,755,621 | 5/1998 | Marks et al. | 463/42 |
| 5,759,101 | 6/1998 | Von kohorn | 463/40 |
| 5,768,382 | 6/1998 | Schneier et al. | 380/23 |
| 5,770,533 | 6/1998 | Franchi | 463/42 |
| 5,774,664 | 6/1998 | Hidary et al. | 395/200.48 |
| 5,779,242 | 7/1998 | Kaufmann | 273/459 |
| 5,779,549 | 7/1998 | Walker et al. | 463/42 |
| 5,788,574 | 8/1998 | Ornstein et al. | 463/25 |
| 5,794,210 | 8/1998 | Goldhaber et al. | 705/14 |
| 5,800,268 | 9/1998 | Molnick | 463/40 |
| 5,809,482 | 9/1998 | Strisower | 705/30 |
| 5,816,918 | 10/1998 | Kelly et al. | 463/16 |
| 5,830,067 | 11/1998 | Graves et al. | 463/40 |
| 5,831,527 | 11/1998 | Jones, II et al. | 340/540 |
| 5,839,725 | 11/1998 | Conway | 273/244 |
| 5,848,396 | 12/1998 | Gerace | 705/10 |
| 5,851,149 | 12/1998 | Kidos et al. | 463/42 |
| 5,857,911 | 1/1999 | Fioretti | 463/40 |
| 5,871,398 | 2/1999 | Schneier et al. | 463/16 |
| 5,879,233 | 3/1999 | Stupero | 463/11 |
| 5,885,158 | 3/1999 | Torango et al. | 463/27 |
| 5,901,287 | 5/1999 | Bull et al. | 395/200.48 |
| 5,916,024 | 6/1999 | Von Kohorn | 463/40 |
| 5,917,725 | 6/1999 | Thacher et al. | 364/410.1 |
| 5,933,811 | 8/1999 | Angles et al. | 705/14 |
| 5,948,061 | 9/1999 | Merriman et al. | 709/219 |
| 5,964,463 | 10/1999 | Moore, Jr. | 273/274 |
| 5,971,397 | 10/1999 | Miguel et al. | 273/371 |

OTHER PUBLICATIONS

Advertising pages (15–16 and Order Form) for QQP games, in eStrategy Plus, believed to be from 1994.

Estavanik, "Designing On–Line, Multiplayer Games", in Game Developer, pp. 14–21, Premier 1994.

Horton, "The Power of ImaginNation", in Advertising Age, Mar. 7, 1994.

Information Sheet for "Action Tracker Electronic Voucher System".

Marketing Plan for Manifest Destiny, Inc., 1994.

O'Connell, "Advertisers Get Benched", Promo, The International magazine for Promotion Marketing, p. 96, Mar. 1994.

* cited by examiner

FIG. 5

| VALUES OF CARDS FROM CARD SEQUENCE OUPUT BY THE CARD DEALER MODULE 38 → | | 3 | 5 | 7 | 2 | 9 | 8 | 10 | 10 |
|---|---|---|---|---|---|---|---|---|---|
| BLACK JACK GAME 610 | PLAYER HAND EVALUATION | 3 | 5 | 10 | – | 19 | | | |
| | HOUSE HAND EVALUATION | | | | | | | | |
| BLACK JACK GAME 614 | PLAYER HAND EVALUATION | | 5 | | | | 13 | 23 | |
| | HOUSE HAND EVALUATION | | | – | 2 | – | 13 | – | 23 |
| BLACK JACK GAME 620 | PLAYER HAND EVALUATION | | | 7 | | 16 | | | |
| | HOUSE HAND EVALUATION | | | | 2 | | 10 | 20 | |
| BLACK JACK GAME 626 | PLAYER HAND EVALUATION | | | | | 9 | 8 | 19 | 18 |
| | HOUSE HAND EVALUATION | | | | | | | | |

METHOD AND SYSTEM FOR PLAYING GAMES ON A NETWORK

RELATED APPLICATION

The present application claims priority from U. S. Provisional Application No. 60/058,006, filed Aug. 27, 1997. This is a continuation-in-part application of pending prior application Ser. No. 09/105,401 filed Jun. 26, 1998, which is a continuation of application Ser. No. 08/759,895 filed Dec. 3, 1996, now U.S. Pat. No. 5,823,879, which claims the benefit of U.S. Provisional Application Ser. No. 60/010,361, filed Jan. 19, 1996, and U.S. Provisional Application Ser. No. 60/010,703, filed Jan. 26, 1996. The entire disclosure of the entire application No. 08/759,895 is considered to be part of the disclosure of the accompanying application and is hereby incorporated by reference.

FIELD OF THE INVENTION

The present invention is related to a method and apparatus for automating the playing games such as blackjack in, e.g., a game tournament context so that they can be played continuously and asynchronously by a potentially large plurality of players substantially, and wherein information related to goods and services for sale can be exchanged between players and sponsors of advertisements presented during the playing of a game.

BACKGROUND OF THE INVENTION

The cost effective automation of playing certain games, like blackjack, has been difficult due to the fact that these games typically require a dealer and only a relatively small number of players may play the game with a single dealer. However, with the popularity of local and wide-area data communication networks, it is desirable to have an automated gaming system for games such as blackjack wherein large numbers of players may cost-effectively and efficiently play such games.

Furthermore, it has been difficult to cost-effectively provide a network gaming system on such networks as the Internet in that gaming restrictions prohibit wagering and ante fees in most contexts except such situations as local area networks within a casino. However, since many players have an interest in playing casino-type games, it would also be desirable to have a way to benefit from interests in such games. Accordingly, it would be desirable to have a system that utilized a gaming context as a vehicle for delivering product and/or service information to users of a network such as the Internet. In particular, it would be desirable to have a data processing system that provided a large number of players with the ability to substantially asynchronously play casino-style games on the Internet for prizes at a reduced risk or at substantially no risk, wherein the data processing system coordinated the presentation of products and/or services from sponsors of the games so that there is a coordinated, interactive exchange of information between players and sponsors regarding advertisements, samples, prizes and questionnaires related to sponsor products and/or services.

Accordingly, since the present invention, as described in the sections hereinbelow, addresses the above-discussed problems within the context of playing blackjack, an overview of this particular game is provided so that the novelty and various related aspects of the present invention may be more fully appreciated.

Description of Blackjack

The card game of blackjack is a game of chance played between a designated player known as a "dealer" and one or more other players. Basically, each player plays against the dealer in the sense that each player attempts to achieve a collection or hand of cards having a total score for the hand closer to the value 21 than the score of the hand of the dealer. However, if a player's card hand goes over 21, the player may lose any wagers bet on the hand regardless of the value of the card hand of the dealer.

In further detail, blackjack is typically played with one or more standard playing card decks wherein each card has a value. In particular, each of the face cards has the value of 10, and non-face card has a value identical to the numerical value as indicated on the card, except for aces. That is, for aces a value may be assigned of either 1 or 11, depending on which value a player deems most beneficial to his/her hand.

In one conventional method for playing blackjack, at the commencement of a blackjack hand, each player initially is provided with two cards and the dealer also receives two cards. Typically, one of the dealer's cards is dealt with the value of the card showing whereas the other card is dealt with the value of the card hidden. However, variations on when the dealer receives his/her cards may depend on the blackjack gaming rules where blackjack is being played but, in any case, one of the dealer's cards must be face-up before the players exercise various wagering options beyond an initial ante.

After a player has reviewed his/her cards, the player may request one or more additional cards in an attempt to get: (a) a value for a card hand that will be greater than the hand the dealer will have, and (b) a value for the card hand that is less than or equal to 21. Further, a player may under certain circumstances, as will be described below, simultaneously play more than one hand of cards against the dealer's cards. However, in requesting such additional cards, a player runs the risk of "busting" each hand played wherein the player loses his/her wager(s) on a card hand by adding cards to the hand until a value exceeding 21 occurs. Further note that such busting of a hand occurs regardless of whether or not the dealer has a card hand value of less than or equal to 21.

Note that after each player has ceased to request further cards (i.e., each player "stands" on his cards), the dealer either takes one or more further cards (i.e., "hits") according to predetermined blackjack rules as established, for example, by the gaming establishment where the blackjack game is being conducted. In general, the dealer must take additional cards if his/her current card count total is less than 17 and the dealer must decline further cards if the dealer's hand has a value of 17 or more. However, there are various rules regarding whether a dealer may stand or hit when the card count total is a "soft 17." That is, one of the dealer's cards is an ace (and therefore may have a value of 1 or 11) and one of the values for the dealer's hand is 17. For example, the dealer may be required to take a hit on a soft 17.

Since a hit(s) taken by the dealer is performed after all players have exercised their wagering options, the final numerical value of the dealer's hand is then compared to the final numerical value of each of the player's hand(s) to determine the winning and losing wagers. Note that if the dealer's hand exceeds the value of 21, then any player that has not busted wins the wagers for their hand(s) regardless of the hand's total value. Alternatively, if the dealer's card hand is less or equal to 21, then it is compared with each of the player's card hand(s) and in each comparison the card hand with the closest total value to 21 without exceeding 21 wins. Of course, ties are possible. In such cases (called a "push"), the player's wager(s) on his/her card hand are returned.

It is typical in blackjack to have at least three additional player options depending on the circumstances of play. A first such option is known as "doubling down" wherein if the player's first two cards have a value within a predetermined range (e.g., 10 or 11), then the player may double his or her wager and once dealt a single additional card, the total of the three card hand becomes the value for the player's hand. Alternatively, another option is that of "splitting pairs" wherein if the player's first two cards are identical with the exception of suit (i.e., a pair), then the pair may be split so that two card hands are created with one card of the pair in each hand. Thus, the player must wager on each of the hands at least the initial wagering or ante amount. Subsequently, a second card and any subsequent successive cards are dealt to each of the separate hands as the player requests and the results of both hands are compared to the dealer's hand, assuming neither the dealer nor either of the player's two hands busts.

In a third option, played immediately after each player has been dealt their first two cards and the dealer has been dealt at least a first card, a player may request "insurance" under the circumstances where the dealer's single face-up card is an ace. In this circumstance, the player is betting that the dealer has blackjack (i.e., a card value total of 21). If the dealer does not have blackjack, then the insurance bet is forfeited and the player plays his/her blackjack hand as if the insurance bet were never made. Note that the player can typically wager an insurance bet of one-half of the amount of his/her initial blackjack wager or ante and if the dealer has blackjack, then the dealer (or the gaming establishment) pays the player double or triple his/her insurance bet.

Further note that options for splitting pairs and doubling down may interact with one another according to certain pre-established gaming establishment rules wherein, for example, a player may double down on one or more of his/her split hands.

Additionally, there are blackjack tournaments having tournament entrants that compete against each other for tournament prizes. In such tournaments each entrant has a fixed initial number of points that can be wagered in a pre-established number of tournament blackjack games to be played. Accordingly, the player having the highest number of points at the end of the tournament wins the tournament. Note that in such tournaments, there may be specific guidelines established at the beginning of the tournament for varying the blackjack gaming rules between tournament games. For example, rules may vary on when a player may split pairs repeatedly during the same blackjack game. Also, double down rules may vary so that, for example, after a splitting of pairs, a player may be allowed to double down on any two cards or, alternatively, an additional wager of less than the initial wager may be acceptable when a player requests to double down.

However, in all known variations of blackjack, players are only allowed to enter a blackjack game at the completion of a previous game and, further, there is a relatively small number of players that can play blackjack at a dealer's station simultaneously. Accordingly, it is desirable to provide a system for playing blackjack wherein potentially a very larger number of players can play blackjack simultaneously from a single dealer station and wherein players can commence playing blackjack at their own discretion without waiting for a previous blackjack game to complete.

SUMMARY OF THE INVENTION

The present invention is a computerized interactive advertising system (i.e., method and apparatus) for exchanging information regarding goods and/or services between a first population of users (hereinafter also known as "players" or "users") and a second population of users (hereinafter also known as "sponsors" or "advertisers"). In particular, the sponsors or advertisers may present information related to goods and/or services to the players using the present invention and the players may view this information while, for example, interacting with the present invention for playing a game such as blackjack, craps, roulette, poker, pai gow or the like. Moreover, a player may also interact with the present invention so that the player has the capability for responding to sponsor or advertiser presented questionnaires, as well as for purchasing or viewing sponsor goods and/or services. Thus, the present invention provides an information exchange service within a gaming context for enticing players to view and/or interact with sponsor presentations such as interactive advertisements.

It is also an aspect of the present invention that each player or user is presented with advertisements for products and/or services, wherein it is believed the player will be receptive to the advertisement. That is, the present invention selectively presents advertisements to each player, according to stored characteristics and preferences of the player that the present invention has determined from, for example, player supplied personal information, player responses to questions, and/or analysis of player interactions such as player requests for additional information related an advertisement. Thus, such a selective presentation of advertisements allows a sponsor or advertiser to provide information related to relatively extensive or expensive promotionals (e.g., demonstrations, samples, discounts, trial subscriptions, prizes, bonuses) to players most likely to subsequently purchase the advertised product or service. Consequently, such selectivity can greatly increase the cost effectiveness of advertising, wherein the term, advertising (or advertising presentation), as used herein is understood to include not only product or service presentations that are merely informational, but also more interactive advertising presentations such as promotionals wherein discounts, free samples or a trial usage may be offered.

Moreover, it is an aspect of the present invention that each player may interact with and play a game at a time and pace (i.e., tempo) substantially of the player's choosing. In particular, the player is not bound by a required order or sequence of play involving other players, even though the player may be in competition with other players. In fact, a player may cease play for an extended time while in the midst of a game and subsequently continue the game at the point where the player ceased to play. Thus, if the present invention is easily accessible, then players may interact with the present invention at their leisure.

Accordingly, in a related aspect of the present invention, it is intended that players (more generally, users) are able to interact with the present invention remotely, as for example, via the Internet and/or an interactive cable television network. Thus, using an Internet embodiment as an exemplary embodiment of the present invention, a gaming web site may be provided wherein players may access the interactive gaming capabilities of the present invention and substantially simultaneously also be presented with sponsor or advertiser provided information related to goods and/or services of the sponsor or advertiser (those two terms being used substantially interchangeably to denote e.g., those who provide advertising to users and/or subsidize game playing, product promotionals or network access). Moreover, the sponsor provided information may include, for example, hypertext links (also denoted hyperlinks) that allow players to activate, for example, network transfers for obtaining additional information regarding a sponsor's goods and/or services regardless of the status of any game in which a player may be currently involved at the gaming web site.

It is a further aspect in one embodiment of the present invention that a player is able to commence play of a game at substantially any time the player accesses the present invention. That is, it is not necessary for any previous game being played by other players to be completed for the player to commence play. In other words, games provided by the present invention may be continuously and asynchronously commenced or entered by players.

It is a further aspect of the present invention to require each player to use a distinct identification provided when the player "registers" with the present invention before playing any games so that a network site for the invention may be able to identify each player. Accordingly, it is an aspect of the present invention during registration, that each player provides personal information about him/herself both for gaming identification and for use as selection criteria by sponsors or advertisers for presenting particular presentations. For example, in the case of an Internet embodiment of the present invention, such registering can be performed via the Internet prior to play of any games at a gaming/advertising web site. Thus, players may be required to provide the present invention with information about themselves such as name, address, E-mail address, age, sex, and/or other player characteristics deemed pertinent to one or more sponsors or advertisers. Accordingly, the present invention provides a sponsor or advertiser with the capability to target its presentations substantially only to players or users having selected characteristics as, for example, determined from player information provided when registering with a network site for the present invention.

It is a further aspect of the present invention to have players compete against one another for prizes in one or more gaming tournaments. Using the Internet embodiment of the present invention as illustrative, a gaming/advertising web site for the present invention may partition the population of players into competitive groups wherein each group includes the players for a distinct tournament. Moreover, the present invention may determine a competitive group according to criteria such as: (a) the game(s) to be played in the tournament; (b) a skill level for the players (e.g., as determined by play in a previous tournament(s)); (c) particular player characteristics such as age, area of residence, home ownership, etc.; (d) particular player lifestyle traits such as traits exhibited by exercise enthusiasts or cruise ship enthusiasts; and (e) particular player preferences such as preferences related to jewelry, personal care products or particular sports.

It is a further aspect of the present invention to allow players to play games offered by the present invention without incurring financial risk or charges beyond those that are typical for the network being used in accessing the present invention.

It is a particular aspect of the present invention to provide blackjack and other casino-style games such as craps, roulette, poker, pai gow, or variations thereof, wherein such games may be played by a plurality of players continuously and asynchronously, and wherein each game is likely to be unique from all other games being played concurrently. Furthermore, in a related aspect of the present invention, such games may be automated so as to not require a manual dealer. Also, the present invention may be played, in one embodiment, in a gaming establishment (e.g., casino) using low cost gaming stations at which players may play such games entirely electronically. Alternatively, in another embodiment, the present invention may be used to play such casino style games as blackjack on the Internet. In this later embodiment, a blackjack game controller for the present invention communicates with blackjack players at Internet client nodes via a web site from which the blackjack game controller is accessed. Thus, blackjack players may play blackjack in the privacy of their own homes and at their leisure since the present invention does not require that a particular tempo of a blackjack game be maintained.

Additionally, the present invention utilizes novel varieties in such games, as blackjack, that make the games more enjoyable for users. For example, using variations of blackjack as illustrative, in one novel embodiment wherein the dealer functions are automated by a dealer module, this module can play blackjack with a plurality of players concurrently such that each player appears to be playing exclusively with the dealer module (e.g., "head-to-head"). Moreover, in one blackjack embodiment, each blackjack game is played asynchronously from other concurrent blackjack games with the dealer module. Furthermore, the dealer module may play a different dealer card hand with each player. In particular, the initial one (or two) cards (or card representations) dealt to the dealer for each game are unlikely to be the same for any two blackjack games being played with the dealer module; i.e., the probability of any two concurrently played blackjack games being identical is substantially equal to chance. Accordingly, this variation is particularly worthwhile when players are playing remotely through a network such as the Internet. Alternatively, in a different blackjack variation, the dealer module and each player concurrently playing blackjack with the dealer module may be provided with cards (or card representations) from the beginning of an identical sequence of card representations. Thus, each concurrently playing player receives an identical initial card hand and the dealer is also dealt an identical initial card hand. Subsequently, the card hands within each concurrent game will vary only if players request further cards differently. Accordingly, this variation of blackjack is particularly useful in tournament blackjack played within the confines of a casino, wherein the play of each player in the tournament is synchronized to start and stop within a predetermined interval. Note that this variation of blackjack is enjoyed by tournament players in that the tournament players may consider it a better or fairer way for demonstrating blackjack playing skill.

Other features and benefits of the present invention will become apparent from the detailed description with the accompanying figures contained hereinafter.

BRIEF DESCRIPTION OF THE DRAWINGS

FIG. 5 provides a simple example of the operation of the present invention for playing a novel variation of blackjack wherein four blackjack games are shown being played asynchronously with the blackjack game controller;

DETAILED DESCRIPTION

Figure 1:
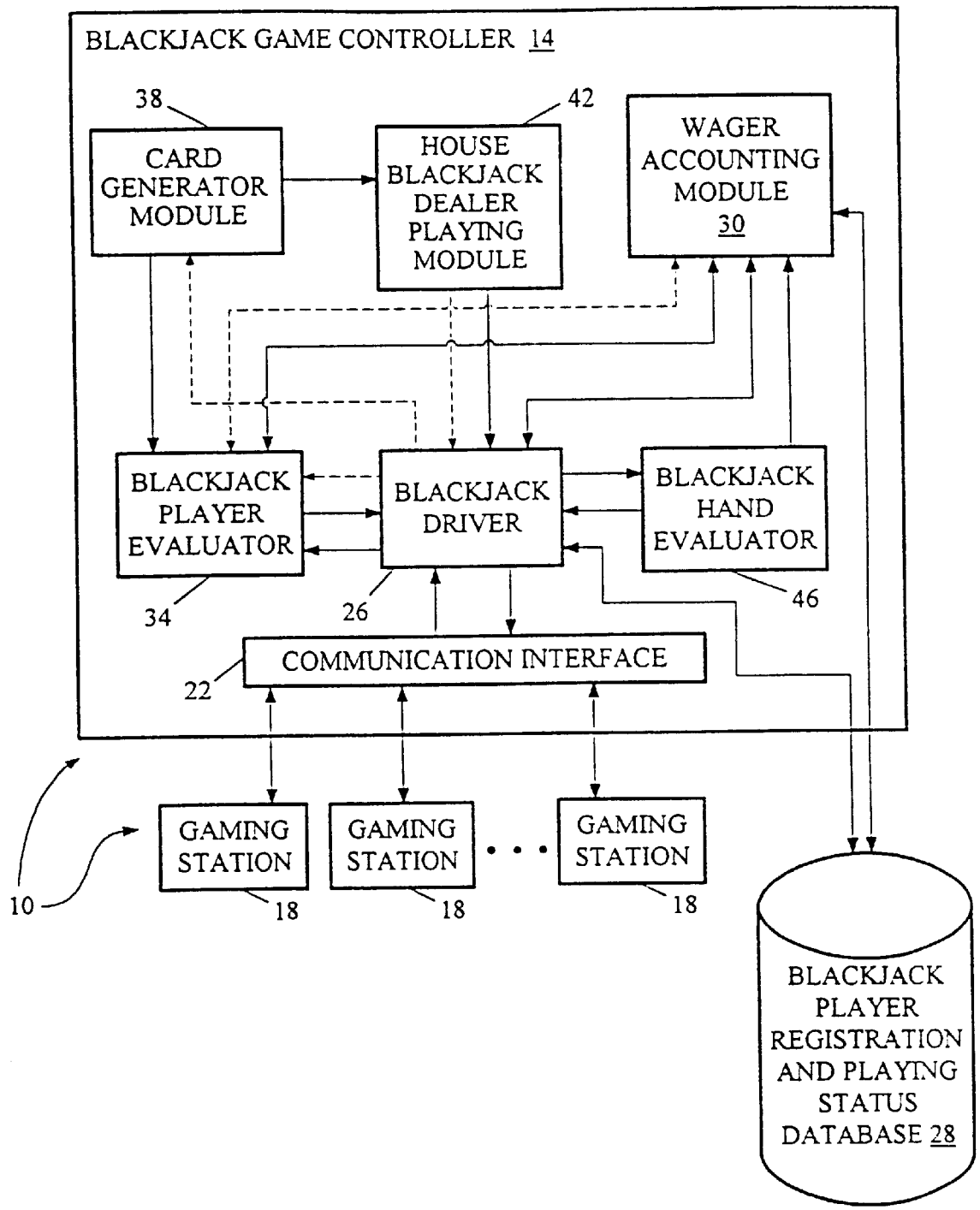
FIG. 1 is a block diagram of an embodiment of the present invention wherein this embodiment may be used within a blackjack gaming establishment such as a casino.

In FIG. 1, a block diagram is presented of a first embodiment of an electronic system 10 for the present invention for playing blackjack, wherein data flows are represented by solid arrows and control flows are represented by dashed arrows. In particular, the embodiment of FIG. 1 presents an architecture for the present invention for use on, for example, a local network within a casino, wherein low cost gaming stations may be utilized. Accordingly, the blackjack gaming system 10 includes a blackjack game controller 14 electronically connected to one or more potentially remote gaming stations 18 so that for each gaming station a player may play blackjack. In the blackjack gaming system 10, the blackjack game controller 14 functions substantially as a dealer would in a manually operated blackjack game and each gaming station 18 provides a blackjack player with an electronic representation of a blackjack game wherein it may appear that the player (i.e., user) at the gaming station 18 is the only player playing against the dealer (i.e., "head-to-head" against the blackjack game controller 14). Accordingly, each gaming station 18, as will be discussed with reference to FIG. 2 below, includes a display for displaying both the dealer's cards and the player's cards. Each gaming station 18 also includes player interaction capabilities for requesting additional cards, activating various blackjack player options at appropriate times, and potentially increasing various wagers at predetermined phases of a blackjack game. Further note that each gaming station 18, when in operation, may request a security code be provided by a player for identifying himself/herself or, alternatively, the gaming station may request the player to insert an electronic card (not shown) into the gaming station 18 so that information electronically encoded upon the card is read at the gaming station and transferred to the blackjack controller 14.

Referring now to the internal structure of the blackjack game controller 14, a gaming station interface 22 is provided for interfacing with each of the gaming stations 18. In particular, the gaming station interface 22 buffers data signals between the other components included within the blackjack game controller 14 and the gaming stations 18. For example, the gaming station interface 22 may have speed matching buffers in order to adjust for differences in speed between the blackjack game controller 14 and the gaming stations 18. A blackjack driver 26 exchanges data with the gaming station interface 22. The blackjack driver 26 substantially coordinates the operation of the blackjack game controller 14. In particular, the following capabilities are substantially provided by the blackjack driver 26:

(1.1) identifies each player requesting to play blackjack at one of the gaming stations 18;

(1.2) creates internal data structures for communication with other modules of the blackjack game controller 14 regarding each blackjack game being played; in particular, blackjack gaming data objects or records are (re) instantiated with each player request, such data objects providing sufficient information for the blackjack game controller 14 to properly respond to each received player request;

(1.3) determines the output of the blackjack game controller 14 to each of the active gaming stations 18;

(1.4) distributes blackjack gaming data between other modules of the blackjack game controller 14; and (1.5) provides card representations to gaming stations In performing the above tasks, the blackjack driver 26 communicates with a blackjack player registration and playing status database 28. The database system 28 maintains in persistent storage information regarding each blackjack player. In particular, the database system 28 maintains:

(2.1) information identifying each player; e.g., a unique player identification code;

(2.2) information regarding, for example, each blackjack player's financial status; in particular, a credit limit and a current amount of funds (either to be paid or received from the player);

(2.3) for each person registered to play blackjack, information regarding the status or context of any game the player is presently playing; that is, sufficient information is stored so that the blackjack game controller 14 can retrieve this information and continue a blackjack game in response to receiving a player's request;

(2.4) for each person registered to play blackjack, information regarding any blackjack tournament that the player is playing; in particular, since such a tournament typically requires a tournament player to complete a specified number of blackjack games in a predetermined amount of time and/or to complete a specified number of blackjack games out of a total number of blackjack games, the following types of information maybe stored: (a) information relating to the number of blackjack games completed by the player; (b) information related to the time and/or the number of games remaining in the tournament; and (c) information related to the amount of funds or points in the player's account for the tournament.

The blackjack driver 26 communicates with a wager accounting module 30 wherein the wager accounting module provides the following capabilities:

(3.1) determines various wagering limit parameters for the next one or more blackjack games to be played (e.g., the wagering limit per game and the total wagering limit per player); and (3.2) performs wagering accounting for each player's wins and losses.

Thus, the wager accounting module 30 is instrumental in initializing a new blackjack game in that this module receives and maintains financial information related to each currently active player at a gaming station 18. Thus, the wager accounting module 30 has a communication data channel with the blackjack player registration and playing status database 28 so that the wager accounting module 30 may retrieve information for determining whether the player has, for example, sufficient financial resources to cover potential wagering losses. Of course, to provide waging evaluation information to other controller 14 modules, the wager accounting module 30 receives identifying information from each such module requesting an evaluation.

The blackjack driver 26 also communicates with a blackjack player evaluator 34. The blackjack player evaluator 34 receives, from each player (via instantiations of blackjack gaming data objects from the blackjack driver 26), all blackjack player requests except the data from each player indicating an amount to be wagered. Thus, the blackjack player evaluator 34:

(4.1) determines each player's options during blackjack games; and
(4.2) responds to player requests for hits or to, for example, split pairs.

Thus, the blackjack player evaluator 34 enforces the gaming establishment rules related to player options during a blackjack game. Note, however, that in responding to certain player requests, the blackjack player evaluator 34 communicates with the wager accounting module 30 to confirm that a proper wager accompanies the requested option and that the wager is acceptable to the wager accounting module 30.

The blackjack player evaluator 34 is supplied with data corresponding to blackjack card representations from a card generator module 38. The card generator module 38 generates, for example, an ordered collection or sequence of substantially random card representations and each such card representation is provided to the blackjack player evaluator 34, wherein the blackjack player evaluator responds to each player's valid hit request by outputting the most recent card representation received from the card generator module 38. That is, each player at a gaming station 18 receives a card representation according to when the player's request is received by the blackjack player evaluator 34.

Further, note that the card generator module 38 also supplies the same card representations as supplied to the blackjack player evaluator 34 to a house blackjack playing module 42, wherein this latter module plays the dealer's hand in each blackjack game. Thus, the house blackjack playing module 42 enforces the blackjack gaming rules on behalf of the gaming establishment. In particular, this module determines when and how insurance bets can be made related to the dealer's cards. Note, as with the blackjack player evaluator 34, the house blackjack playing module 42 outputs, when required to provide the dealer's hand with another card representation at a gaming station 18, the most recent card representation received from the card generator module 38. Further note that the house blackjack playing module 42 provides control information to the blackjack driver 26, particularly regarding activation of the blackjack insurance option. This information, in turn, is conveyed to the blackjack player evaluator 34 so that this latter evaluator may activate the insurance option for each player at an active gaming station 18.

A blackjack hand evaluator 46 is also in communication with the blackjack driver 26. The blackjack hand evaluator 46 evaluates each player's hand(s) in comparison to the dealer's blackjack hand for determining the win/loss/tie for each player's hand. Thus, the dealer's hand and the one or more hands played by each player at a gaming station 18 is supplied to the blackjack hand evaluator 46. Subsequently, this evaluator outputs win/loss/tie results to the gaming stations 18 via the blackjack driver 26 and the gaming station interface 22. Further, the blackjack hand evaluator 46 also outputs win/loss/tie results along with the identity of the player playing each hand to the wager accounting module 30 so that wager credits and debits for each player's account may be updated according to the last or most recent blackjack game results.

Figure 2:
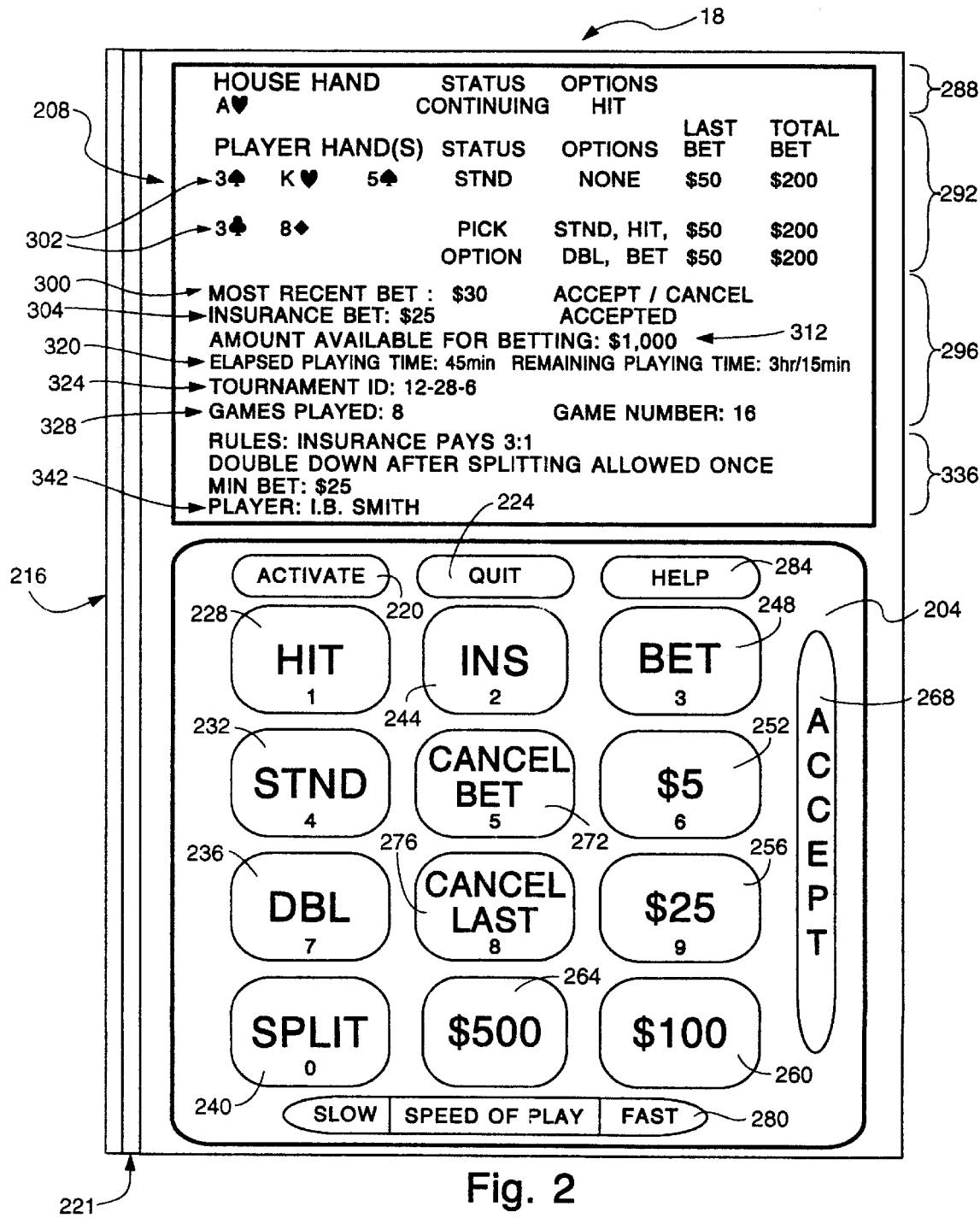
FIG. 2 provides a representation of the gaming stations 18 of FIG. 1 wherein these gaming stations are used in gaming establishments for playing blackjack.

In FIG. 2, an embodiment of a gaming station 18 is illustrated. The gaming station 18 includes a player input area 204 wherein a player may press touch-sensitive portions of a thin film laminated with blackjack player operations and requests. Immediately above the player input area is a player output display area 208 for displaying blackjack gaming information related to the player. Optionally, each gaming station 18 may include a player identification card reader 216 so that a blackjack player may identify him/herself at a gaming station 18 by swiping a magnetic identification portion of a player identification card (not shown) through the card slot 221 thereby allowing the card reader 216 to transmit the player's encoded identification upon his/her card to the blackjack game controller 14. However, it should be noted that other configurations of the gaming station 18 are also contemplated by the present invention. In particular, gaming station 18 may not have a card reader 216. Instead, a blackjack player may be required to register either manually or automatically at a site remote from the gaming station 18, or, alternatively personal identification numbers may be provided to players for identifying themselves via the player input area 204 wherein, for example, a numeric digit provided in the lower bottom portion of some of the touch-sensitive areas may be used by the player to input a personal identification number. Further, the arrangement of the touch-sensitive portions of the player input area 204 and the format of the display area 208 (both being discussed in detail below) may have other arrangements and still be within the scope of the present invention.

Describing in detail now the touch-sensitive portions of the player input area 204, an activate/enter next game button 220 is provided. This button is used to initially activate the gaming station 18 so that a "request to play" signal is transmitted to the blackjack driver 26. That is, assuming a player activates this button at a gaming station 18, the blackjack driver 26 responds by requesting that the player input his/her identification via, for example, placing an identification card in the card reader 216 and/or a personal identification number via the player input area 204. Additionally, note that the button 220 may be pressed at the end of a blackjack game for indicating that the player wishes to play another blackjack game. Note that in one embodiment of the present invention when consecutive games are played by a player, the player need only press the button 220 to commence a new game. That is, the player's identification need not be entered for each consecutive game played (assuming the button 220 is activated within a predetermined time after the last game has terminated).

The player input area 204 also includes a quit button 224 that a player may press to explicitly indicate the player's desire to terminate any further gaming at the gaming station 18.

Additionally, buttons 228 through 248 provide the player with the capabilities to request the following blackjack gaming requests:

(5.1) The "HIT" button 228 allows the player to request another card to be dealt to him/her.
(5.2) The "STND" button 232 allows the player to stand on a current blackjack hand.
(5.3) The "DBL" button 236 allows the player to double down under appropriate circumstances as determined by the blackjack player evaluator 34.
(5.4) The "SPLIT" button 240 allows the player to split the player's first two cards into two separate blackjack hands when these first two cards are identical.
(5.5) The "INS" button 244 allows the player to request insurance under the circumstances where the dealer's single face-up card is an ace.
(5.6) The "BET" button 248 allows the player to request that a bet or wager be entered during a blackjack game.

Note that subsequent to requesting a bet via the "BET" button 248, the buttons 252 through 264 are activated so that the player may input various betting amounts. In particular, buttons 252 through 264 provide the player with the option to bet $5.00 (button 252), $25.00 (button 256), $100.00

(button 260) and $500.00 (button 264). Moreover, a sequence of the buttons 252 through 264 may be pressed for obtaining a bet not provided by a single button. For example, to bet $130.00, the player presses consecutively each of the buttons 252, 256 and 260 (in any order) exactly once.

The player input area 204 also includes various confirm and cancel buttons 268 through 276. The accept button 268 allows the user to accept a last input. For example, it is an aspect in the present embodiment of the invention that after each user input, the input is accepted either by the player explicitly pressing the accept button 268 or by allowing a predetermined amount of time to expire after the last player input. The "CANCEL BET" button 272 allows the user to cancel an immediately preceding bet that was input. However, note that if a time limit is exceeded for placing a bet due to, for example, the player pressing the "CANCEL" button 272, then any minimum bet required will be automatically wagered on the player's behalf by the wager accounting module 30. Further, the "CANCEL LAST" button 276 may be used by the player to cancel the immediately preceding wager of one of the dollar amount buttons 252 through 264. Thus, if a player intended to bet $125.00 by pressing first the button 260 followed by the button 256 but instead pressed the button sequence 260 and 264, then the player may press the button 276 for canceling the $500.00 bet associated with button 264 and subsequently the player presses the button 256 to obtain the desired bet of $125.00. Note further that pressing the "CANCEL LAST" button twice in succession also cancels the entire bet.

A "SPEED OF PLAY" button 280 may be optionally provided on the player input area 204. This button allows the player to specify to the blackjack driver 26, for example, the predetermined amount of time after a player input to wait before each subsequent input is automatically accepted. In one embodiment of the present invention, the "SPEED OF PLAY" button 280 includes active areas at each end of the button, wherein if the user presses the "slower" end of the button 280, then the predetermined time(s) for automatically accepting a player input is lengthened. Alternatively, if the player presses the "faster" end of the button 280, then the predetermined default acceptance time(s) becomes shorter. However, it is important to note that the tempo of the blackjack game is, using the present invention, no longer as important as in typical blackjack gaming situations. That is, since each blackjack player using the present invention is not playing in sequence with other players, there is less concern about speedily playing so as not to delay other players.

Lastly, the player input area 204 includes a "HELP" button 284 for allowing the player to request assistance from, for example, the personnel of the gaming establishment providing the gaming station 18.

Referring now to display area 208, the screen display provided here is but one of a number of contemplated screen layouts for the present invention. In particular, the screen layout illustrated in display area 208 is a representative layout for use in playing tournament blackjack. Thus, when other modes of blackjack are played other than tournament blackjack, then it is within the scope of the present invention to modify the fields represented in the display area 208 according to the player needs for the type of blackjack being played. Further, it is important to note that in one embodiment, the display 208 is in color so that, for example, diamonds and hearts are in red and spades and clubs are in black, and various fields of the display area 208 may be highlighted for focusing a player's attention on the portion of the display providing information most relevant to the player's currently permissible options.

Describing now the fields currently presented in display 208, at the top of the display is the house hand area 288: (a) for providing a representation of the cards that have been dealt to the house; (b) for providing a status of the house hand (i.e. one of: "STND" for standing, "BUSTED", when the value of the house hand exceeds 21, and "CONTINUING" when the house may take additional hits. That is, this field provides an annotation "house hand" followed by a representation for at least one card that has been dealt to the house; i.e., an ace of hearts. In the player's hand area 292 of the display area 208, there are five columns providing information related to each blackjack hand the player is currently playing in the blackjack game. The columns provide the following information:

(6.1) The "PLAYER HAND(S)" column provides, in each row of this column, a different blackjack hand that is being played simultaneously by the player in the current blackjack game. Thus, two blackjack hands are presently represented as being played simultaneously by the player on the display area 208. That is, an upper or first hand having a three of spades, king of hearts, and a five of spades, and, a lower or second blackjack hand having a three of clubs and an eight of diamonds. (Note, when a player chooses to double down, card representations in common between two blackjack hands may be displayed in a row between the remaining card representations for both hands. Alternatively, card representations in common between blackjack hands may be duplicated in the blackjack hands to which the common cards representations apply.)

(6.2) A "STATUS" column for indicating the current status of each blackjack hand the player is playing. That is, for the first or upper hand that the player currently is playing the status is "STND" thereby indicating that the player has elected to stand on this hand. Alternatively, for the second or lower hand a status of "PICK OPTION" is provided thereby indicating that it is the player's turn to pick a blackjack playing option for this hand. Note that there are at least three possible values for the status field of each blackjack hand being played. That is, in addition to the two represented in FIG. 2, a "BUSTED" status value is output for indicating that the value of the related blackjack hand has exceeded 21.

(6.3) The "OPTIONS" column provides, for each blackjack hand being played, an indication of the permissible blackjack plays that the player currently may select from for the related blackjack hand in the same row. Thus, for the first hand illustrated in area 292, there are no options remaining for the player to play related to this hand. However, on the second hand, four permissible player inputs are displayed as options to the player. That is, the player may stand on the related hand (STND) by pressing button 232, the player may request a hit (HIT) by pressing button 228, the player may double down (DBL) by pressing button 236 and the player may bet an additional wager by pressing button 248 and subsequently putting a bet amount using buttons 252 through 264.

(6.4) The "LAST BET" column displays to the player his/her last bet for each blackjack hand the player is currently playing. In particular, for both the upper and lower hands shown in area 292, the player's last bet was $50.00.

(6.5) The "TOTAL BET" column displays to the player the total bet the player has wagered on the blackjack hand to which it relates. For example, in FIG. 2, in both the upper and lower player's blackjack hands displayed, the player has bet a total of $200.00.

Below the player hand area 292 is the player information area 296 wherein additional blackjack gaming information relating to the player is displayed. In particular, labeled line 300 displays the most recent bet amount that the player has requested along with a tag indicating the status (e.g., "ACCEPT/CANCEL") of the most recent bet. Note that the status may be: (a) "ACCEPTED" for explicitly or implicitly indicating the acceptance of a displayed wager (via the player pressing the accept button 268 or by default due to a time limit expiring); (b) "CANCELLED" for explicitly indicating the cancellation of the last entered wager (via the player pressing either of the cancel buttons 272 or 276); (c) "REJECTED", this status being displayed due to the wager accounting module 30 rejecting the player's most recent bet; and (d) "ACCEPT/CANCEL" for indicating that the present invention is waiting a predetermined amount of time for the player to explicitly accept or cancel the most recent bet. Thus, in the example of line 300 in FIG. 2, the player has indicated a most recent bet of $30.00 and the blackjack driver 26 has output a status of "ACCEPT/CANCEL" as in (d) above. Further note that the blackjack hand(s) to which this most recent bet applies may be designated in any of a number of ways such as, for example, highlighting the row(s) in the player hand area 292 of the blackjack hand(s) to which the most recent bet of line 300 applies. Alternately, an indicator such as arrows 302 may be used as in FIG. 2 to indicate to the player that the most recent bet is to be applied to both the upper and lower blackjack hand(s).

Additionally, note that line 304 displays the annotation "INSURANCE BET:" together with any insurance amount that has been bet by the player. Accordingly, the dollar amount on line 304 and the notation at the right end of the line pertain, respectively, to the amount that has been bet as insurance, and the status of this bet (i.e., one of "ACCEPTED", "CANCELLED", "REJECTED" or "ACCEPT/CANCEL" as in line 300).

In line 312 of the player information area 296, the total amount of funds available by the player for betting is displayed. For example, line 312 of FIG. 2 indicates that the player has a total amount for betting of $1,000.00. Note that the wager accounting module 30 maintains this total amount available for betting and updates it after each blackjack game.

The lower three lines 320, 324 and 328 of the player information area 296 provide blackjack player information that is particularly useful when playing in a blackjack tournament. Thus, the information in these three lines may not be displayed when the present invention is used by players not in a tournament. In line 320, two fields are provided for displaying playing time information. The leftmost field, annotated by the label "ELAPSED PLAYING TIME:", displays the total amount of time the player has played blackjack (which in this case is 45 minutes). Alternatively, the rightmost field, annotated by the label "REMAINING PLAYING TIME:", displays the time remaining in the tournament.

In line 324 an identifier for any tournament associated with the present blackjack game is displayed.

In line 328, up to two additional fields are provided that are useful in tournament blackjack. The leftmost field having an annotation of "GAMES PLAYED:" displays to the player the number of blackjack games he/she has completed within a tournament. Note that in some blackjack tournaments each player is required to complete a certain predetermined number of games within a predetermined allotted time period. For example, a blackjack tournament may require each player to play 50 games within a predetermined interval (such as four days). Relatedly, but optionally, in blackjack gaming contexts where the total number of blackjack games in the tournament is meaningful, the rightmost field of line 328, having the annotation "GAME NUMBER:", displays to the player the total number of tournament games that have been completed thus far in the tournament. Accordingly, using at least the leftmost annotated field in line 328 and "REMAINING PLAYING TIME:" annotated field of line 320, the player is able to determine the number of remaining games in the tournament that he/she must play.

Further note that other blackjack game values are contemplated by the present invention. For example, a field providing the number of games remaining that a player must play in the tournament may be added (or substituted for) in addition to the current values in the player information area 296.

In a next display 208 lower area, denoted the rules area 336, blackjack house rules are displayed. In particular, the house rules displayed in area 336 allow variations upon the typical blackjack rules that a player is likely to assume if not presented with information to the contrary. Note that by providing these additional rules on the display of gaming stations 18, successive blackjack games may be provided with different house blackjack rules thereby creating an increased interest in each game by the players and requiring additional blackjack playing skills from the players. Note that three house rules are provided in the present display area 336. That is, (a) insurance for the present blackjack game pays 3 to 1 odds (instead of the typical 2 to 1 odds); (b) the player may double down after splitting only once; and (c) the minimum bet is $25.00 for the current game.

Lastly, the display 208 includes a player identification area 342 for identifying the player currently playing blackjack at the gaming station 18. The present player area 342, includes a field having the current player's name (e.g., I. B. SMITH). However, other fields identifying the player are also contemplated by the present invention including, for example, a player identification number such as the number that may be encoded upon a player identification card used in conjunction with the card reader 216 for identifying the player.

Figure 3:
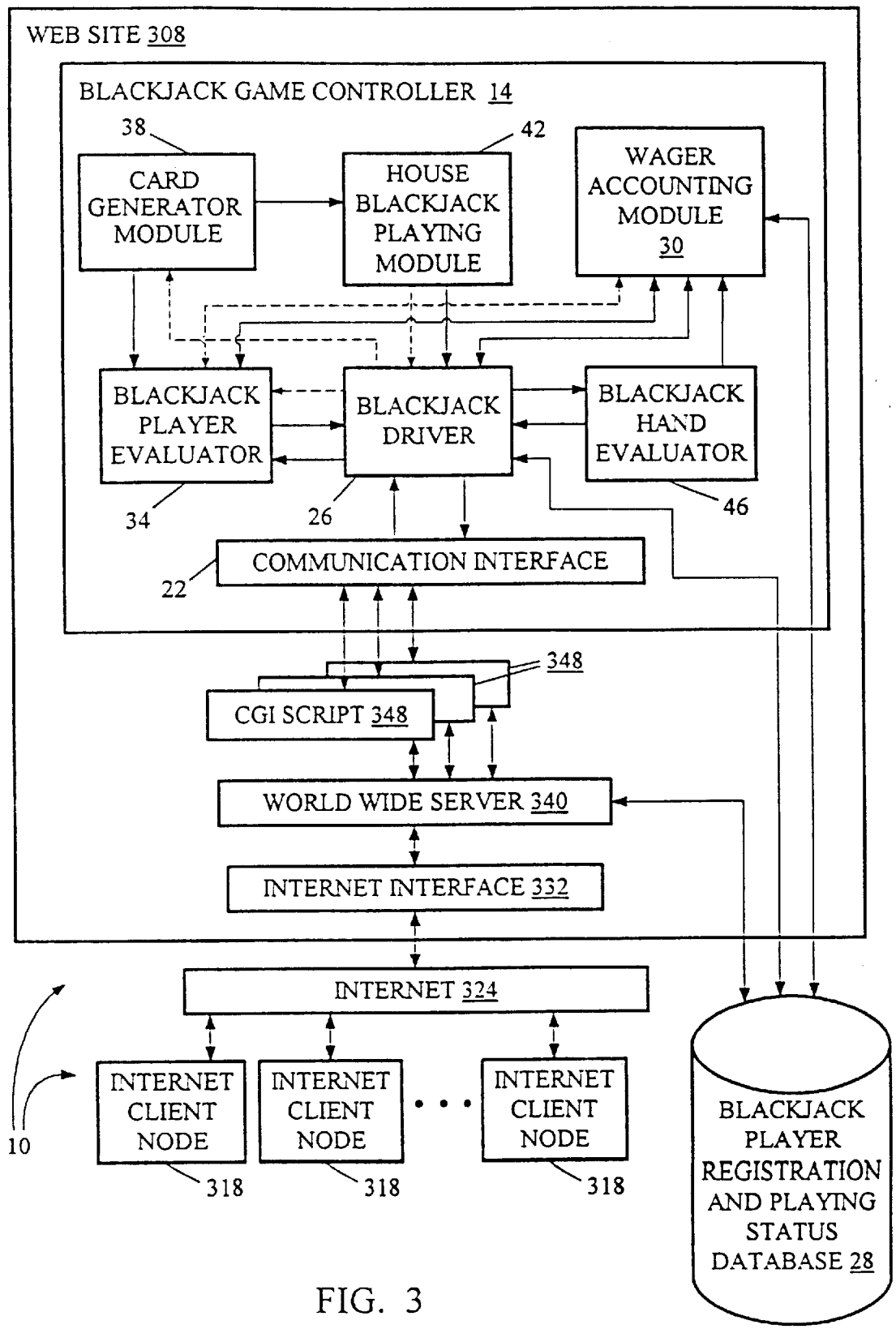
FIG. 3 is a block diagram of an alternative embodiment of the present invention wherein the present invention is used to play blackjack on the Internet.
Figure 4A:
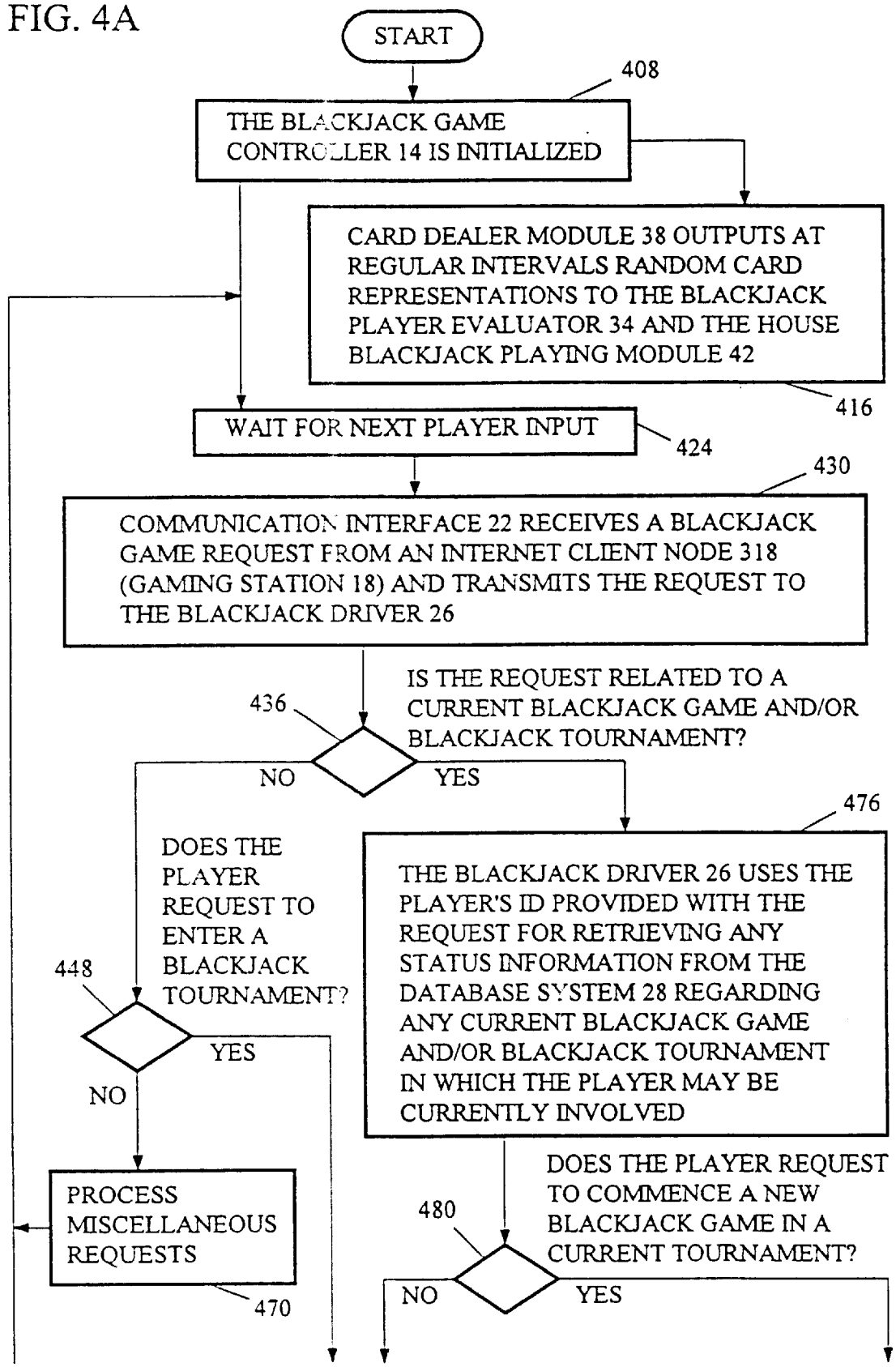
FIGS. 4A–4E represent a flowchart for the processing performed by the blackjack game controller 14 when processing blackjack requests from players in either of the embodiments of FIG. 1 or FIG. 3.
Figure 4B:
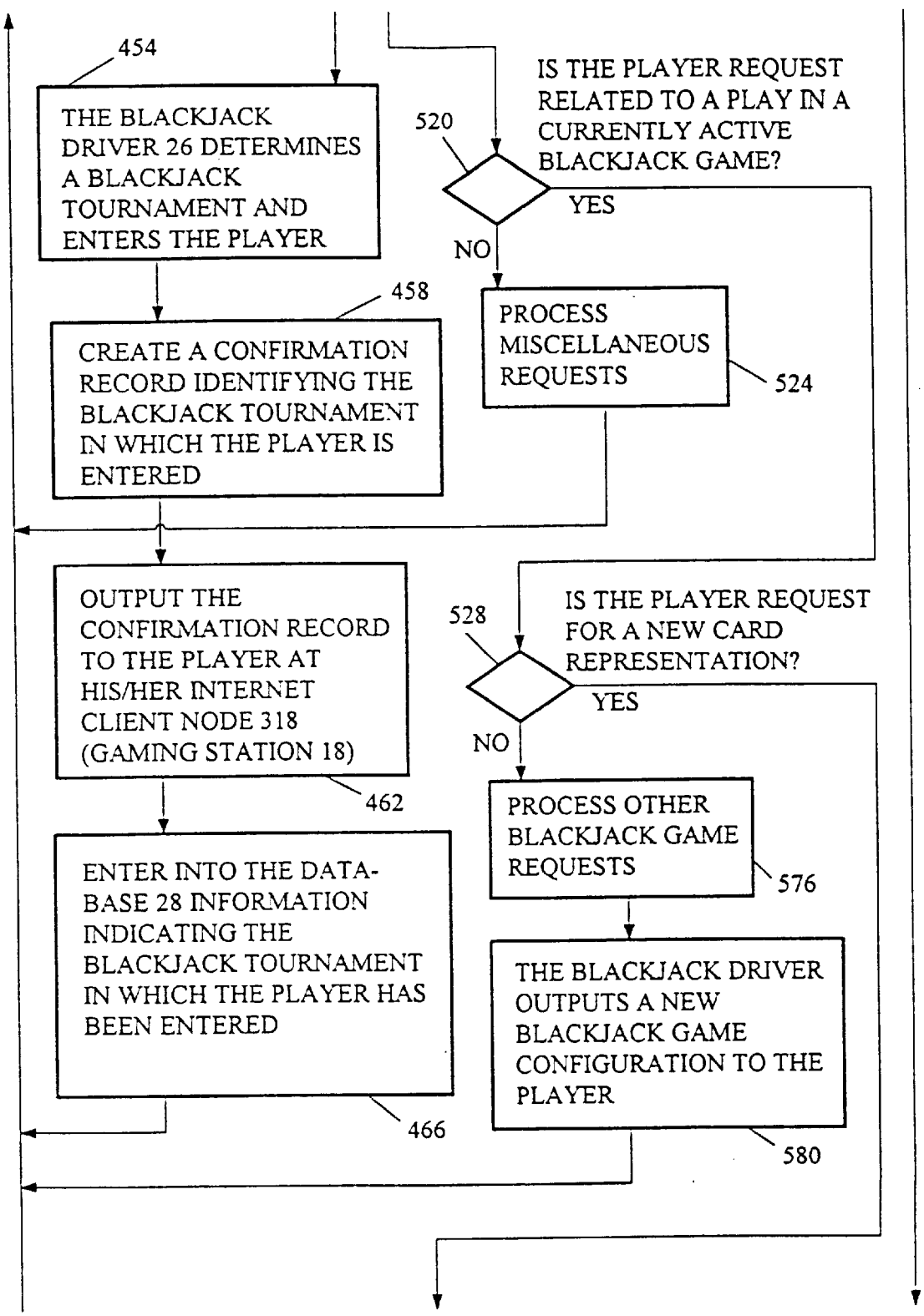
Figure 4C:
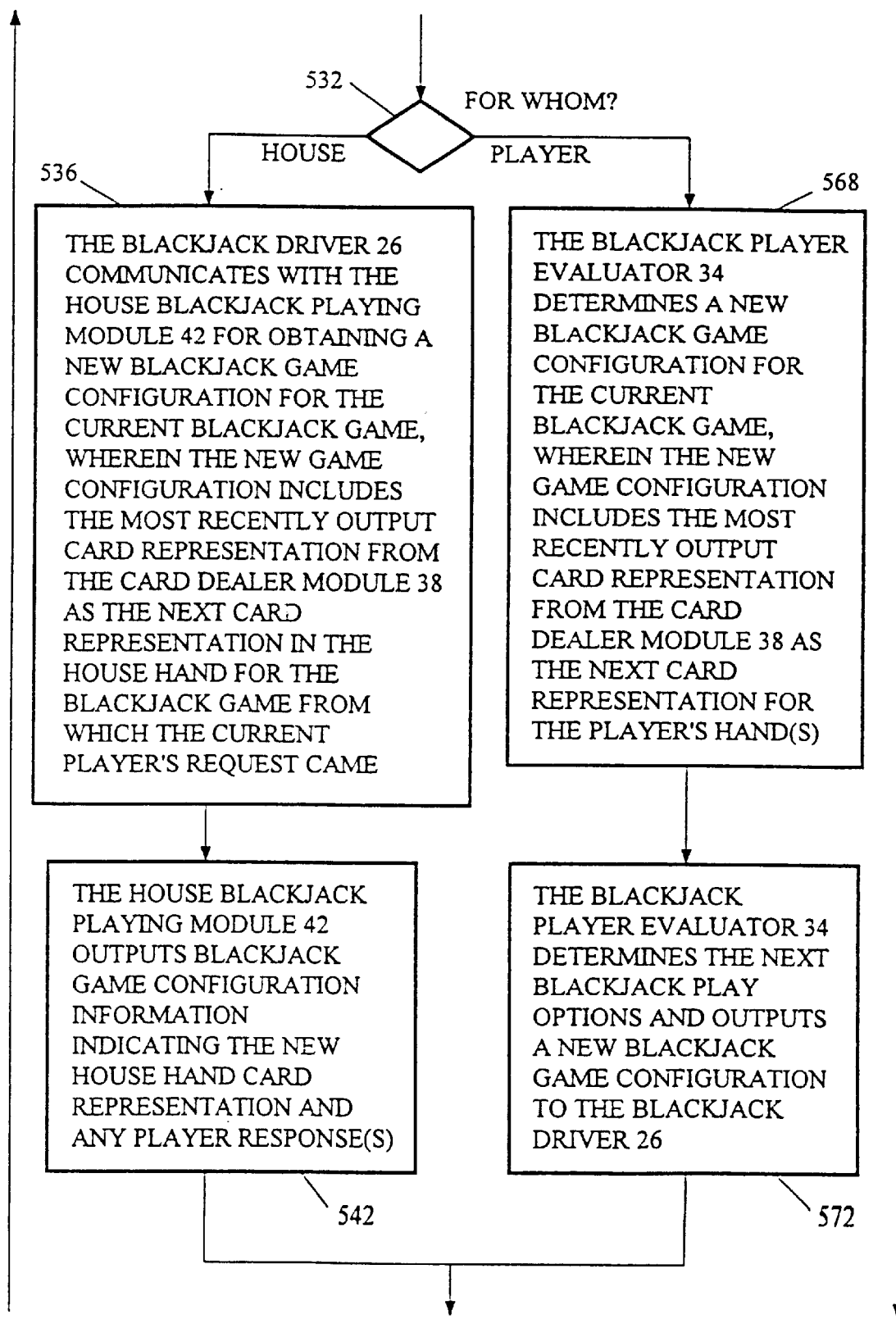
Figure 4D:
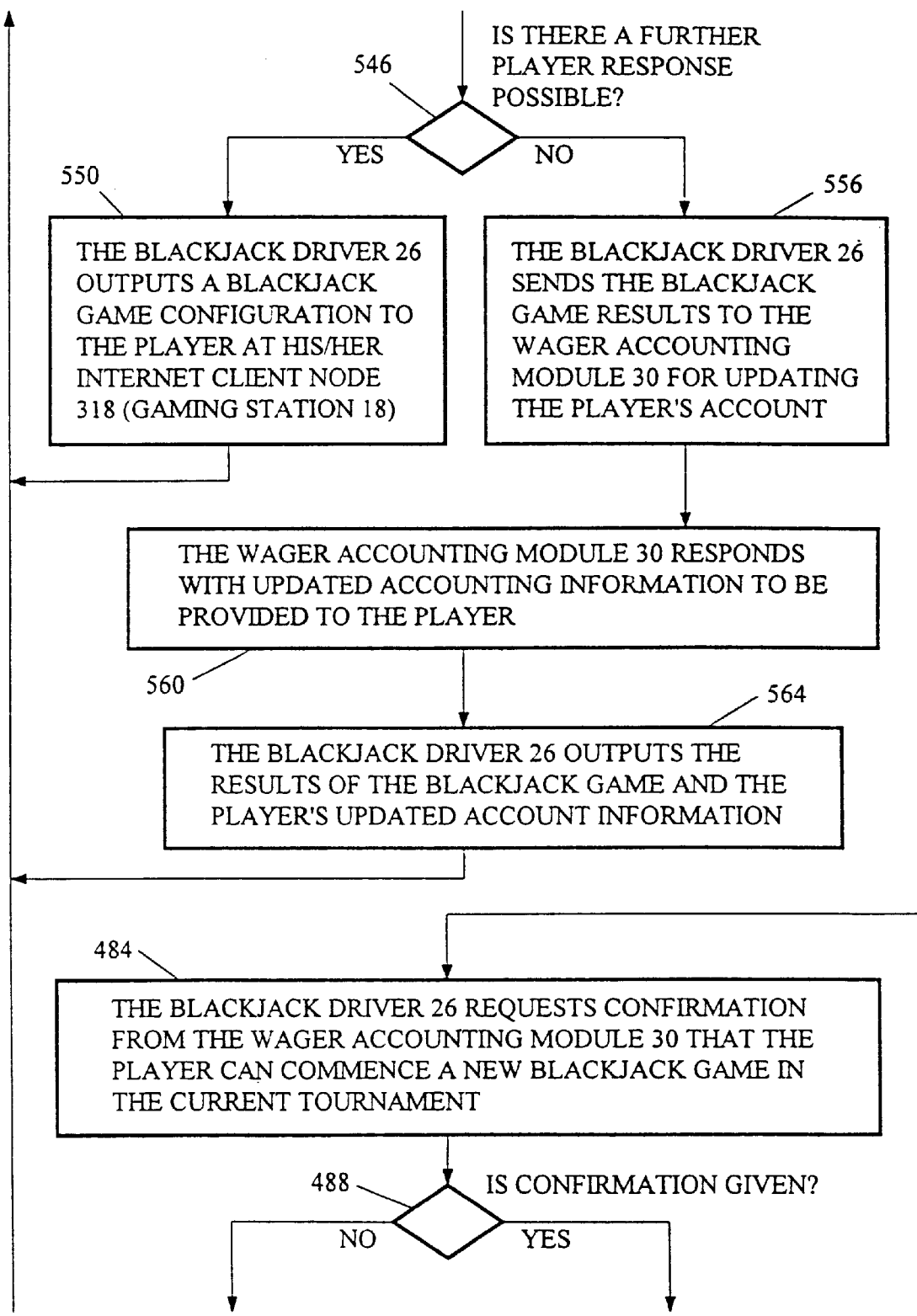
Figure 4E:
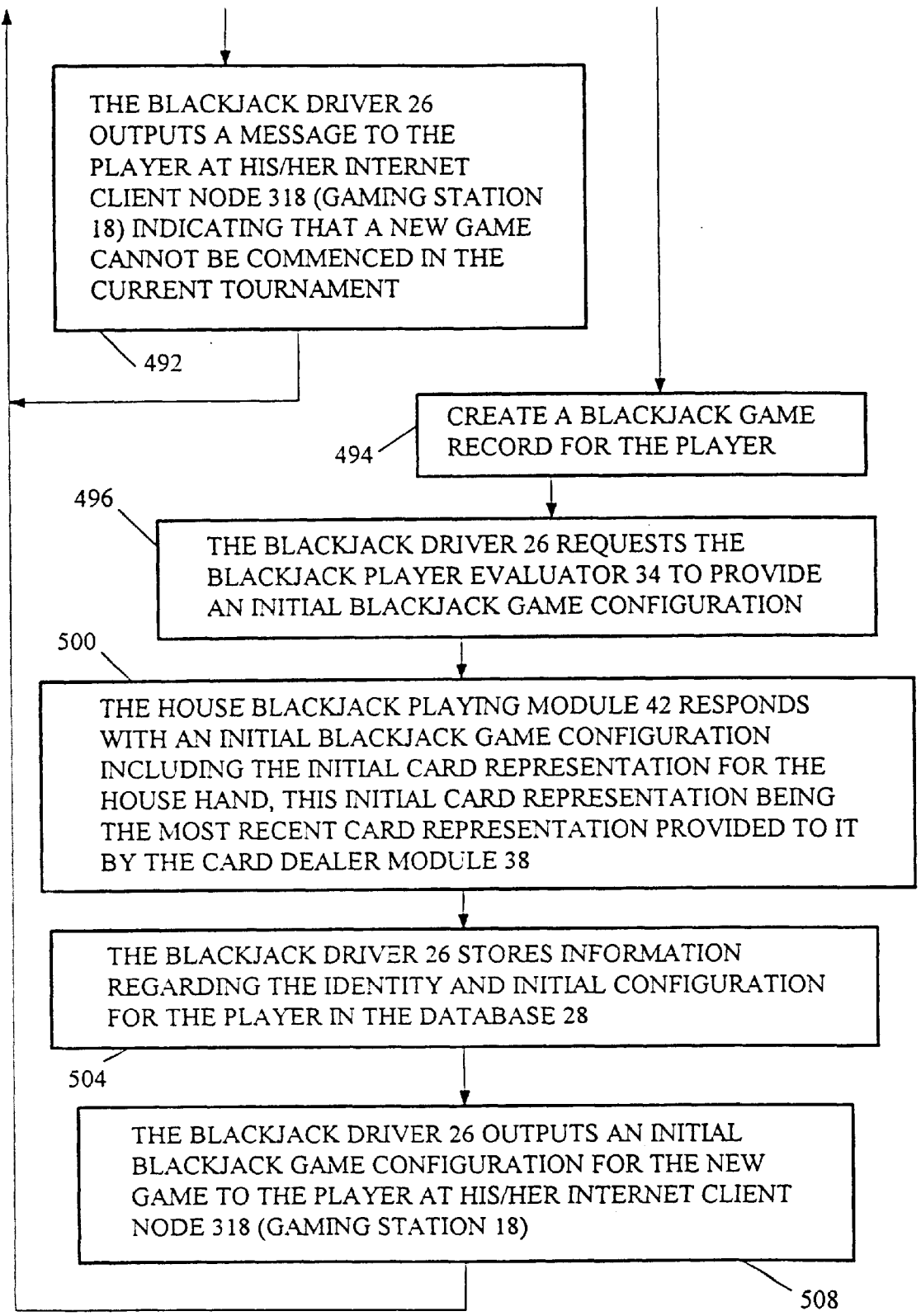

FIG. 3 presents a second embodiment of the blackjack gaming system of the present invention. In this embodiment, the blackjack game controller 14 is substantially the same as described hereinabove. However, this controller 14 is now accessible through an Internet web site 308 so that blackjack players at Internet client nodes 318 can play blackjack on the blackjack game controller 14 via the Internet 324 (or more particularly, via the World Wide Web).

Accordingly, describing the web site 308 in more detail, it includes an Internet interface 332 for receiving and supplying communications between the Internet 324 and the remainder of the web site 308. The Internet interface 332, in turn, communicates with World Wide Web server 340: (a) for validating and/or initiating registration of web site users (e.g., blackjack players) at web site 308; and (b) for interpreting Internet requests for routing and/or activating web site 308 modules that can fulfill such requests. Thus, the World Wide Web server 340 may access the database system 28 for determining the registration identity of, for example, a blackjack player. Additionally, upon receiving user registration confirmation regarding an Internet (e.g., World Wide Web) request, the World Wide Web server 340 activates instantiations of modules known as common gateway interface (CGI) scripts, each CGI script 348 instantiation (or, for simplicity, each such instantiation also being referred to as a CGI script 348) being: (a) for interpreting and processing Internet requests according to the semantics of a web site 308 application associated with the CGI script; and (b) for constructing Internet responses from output from the associated application. Thus, there are one or more common gateway interface modules provided wherein each CGI script 348 (instantiation) invokes the blackjack game controller 14 to process a single Internet blackjack request from an Internet client node 318 where a player is playing blackjack, and subsequently the CGI script 348 constructs an appropriate Internet response from the output received from the blackjack game controller 14.

Since the embodiment of the blackjack game controller 14 of FIG. 3 is substantially identical to that of FIG. 1, a description of its internal structure is not repeated here. However, it is worthwhile to note that the embodiment of FIG. 3 is particularly appropriate when the blackjack game controller 14 executes on a different or remote processor from that of, for instance, the processor performing the CGI script(s) 348. Further, note that if the blackjack game controller 14 executes on the same processor as the other web site 308 modules of FIG. 3, then the communication interface 22 may be unnecessary, and additionally, much of the functionality of the other components of the blackjack game controller 14 may be incorporated into one or more CGI scripts 348. Thus, for example, the blackjack player evaluator 34 functionality may be incorporated into one CGI script 348 while house blackjack playing module 42 functionality may be incorporated into another CGI script.

There are also noteworthy distinctions between the gaming stations 18 of FIGS. 1 and 2 and the Internet client nodes 318 of FIG. 3 as well as distinctions in blackjack play interactions. For example, the following distinctions may be provided:

(7.1) Due to the potentially lengthy delays that occur on the Internet, the embodiment of FIG. 3 does not provide for automatic acceptance of a blackjack play (e.g., acceptance of an input bet or a default to a minimum ante) due to a time period expiring. Thus, the speed of play is determined by the responsiveness of each player and the responsiveness of the Internet.

(7.2) Players may play blackjack in tournaments against one another on the Internet wherein, for each tournament entered by a player, he/she receives, without cost, a predetermined number of points to use for playing in the tournament. Note that prizes may be awarded to tournament winners as incentive to play in such blackjack tournaments. Further note that the time period to complete a tournament may be substantially more lengthy than the time periods for typical blackjack tournament play. For example, a tournament may extend for 90 days since players can play at their leisure.

(7.3) The input keys of gaming station 18 of FIG. 1 may be also presented on the display screens of Internet client nodes 318 wherein the input buttons of gaming station 18 now become active buttons on a blackjack web page generated by the web site 308 and presented to a player at an Internet client node 318. However, note that at least the speed of play key 280 is not necessary, as mentioned in reference to the embodiment of FIGS. 1 and 2 since the speed of play is of diminished importance.

(7.4) There may be other types of information output to an Internet client node 318 in addition to the information displayed in FIG. 3. In particular, advertising information may be provided with each web site 308 response to a player regarding, for example, blackjack tournament sponsors and prizes.

In FIGS. 4A–4E, a flowchart is presented of the high level steps performed by the blackjack game controller 14 when processing player requests in either of the embodiments of FIG. 1 or 3 for playing a novel blackjack variation wherein new eligible card representations are generated periodically regardless of whether they are dealt in a blackjack game or not and wherein the blackjack players may play the game asynchronously from one another. In step 408, the blackjack game controller 14 is initialized so that it may process blackjack player requests and output appropriate responses to each player's request. Subsequently, in step 416, the card generator module 38 commences to output at regular intervals (e.g., less than two seconds such as every 0.5 seconds) random card representations to both the blackjack player evaluator 34 and the house blackjack playing module 42. Thus, for as long as the blackjack game controller 14 is properly responding to blackjack player requests, the card generator module 38 continuously and regularly outputs card representations. Concomitantly with the actions in step 416, the remaining steps of FIGS. 4A–4E are performed. Thus, in step 424, the controller 14 waits for a (next) blackjack player input, such inputs being, for example, requests to enter a new blackjack tournament, requests to commence a new blackjack game within a tournament, requests to process a blackjack game play request, a request for information regarding the players account, and a request for help information (such as how to play blackjack).

Upon receiving a blackjack player request, in step 430 the communication interface 22 queues the request and subsequently transmits the request to the blackjack driver 26. In step 436, a determination is made as to whether the player's request is related to a current blackjack game and/or current blackjack tournament. If not, then step 448 is encountered wherein an additional determination is made as to whether the player's request is to enter a new blackjack tournament. If so, then in step 454 the blackjack driver 26 determines a blackjack tournament and enters the player into the tournament. Note that in providing this function, the blackjack player 26 communicates with the wager accounting module 30 to confirm that the player is eligible to enter a new tournament. Thus, the blackjack driver 26 supplies the wager accounting module 30 with at least the player's identification and a specification of the tournament in which the player may be entered. Note that the tournament selection may be provided by the player in some embodiments of the present invention. Alternatively, the blackjack driver 26 may select a tournament for the player using tournament information stored in the database system 28. Assuming that the wager accounting module 30 responds with a confirmation that the player may be entered into the selected tournament, in step 458, the blackjack driver 26 creates a confirmation record identifying the blackjack tournament in which the player is entered. Subsequently, in step 462 the blackjack driver 26 outputs information in the confirmation record to the player at his/her Internet client node 318 (gaming station 18). Thus, in the embodiment of FIG. 3 of the present invention, the output of step 462 (and all subsequent such outputs to a blackjack player) are output from the blackjack driver 26 to the communication interface 22 for queuing until the output can be transmitted to the CGI script 348 that initiated the player request to which this output is a response. Subsequently, the output is transmitted to the World Wide Web server 340 and to the Internet interface 332 for transmitting on the Internet 324 and thereby being routed to the Internet client node 318 where the player is playing blackjack.

Following step 462, in step 466, the blackjack driver 26 enters, into the database system 28, information indicating the blackjack tournament in which the player has been entered. Note that the information entered here into the database system 28 is subsequently accessible both by the blackjack driver 26 and the wager accounting module 30 for determining the tournament(s) in which the player has been entered. Following this step, since the player's request has been processed, the flow of control loops back to step 424 to wait for the next player input from a player at an Internet client node 318 or alternatively a gaming station 18.

Returning now to step 448, if the player has not requested to enter a blackjack tournament then step 470 is encountered to process any miscellaneous blackjack player requests not related to a current blackjack game and/or blackjack tournament. For example, a player may request accounting information related to his/her blackjack gaming account. Assuming such requests are processed and responded to in this step, the flow of control again returns to step 424 to wait for a next player input.

Returning now to step 436, if the player request is related to a current blackjack and/or blackjack tournament, then step 476 is encountered wherein the blackjack driver 426 uses the player's identification (ID) provided with the request for retrieving any status information from the database system 28 regarding any current blackjack game and/or blackjack tournament in which the player may be currently involved. Subsequently, in step 480, a determination is made as to whether the player request is to commence a new blackjack game in a current tournament. If so, then in step 484 the blackjack driver 26 requests confirmation from the wager accounting module 30 that the player can commence with a new blackjack game in the current tournament. That is, the wager accounting module 30 determines whether the player has sufficient tournament credits to continue in the tournament. Following this, in step 488, the blackjack driver 26 determines whether a confirmation has been received from the wager accounting module 30. If no such confirmation is provided, then in step 492, the blackjack driver 26 outputs a message to the player at his/her Internet client node 318 (gaming station 18) indicating that no further blackjack games in the current tournament may be played by the player.

Alternatively, if in step 488 the blackjack driver 26 receives confirmation from the wager accounting module 30, then in step 494 the blackjack driver 26 creates a blackjack game record for fulfilling the player's request. Note that in creating the new blackjack game data record, the blackjack driver 26 communicates with the wager accounting module 30 to both debit the player's account for any initial ante corresponding to commencing the new blackjack game and also to output to the blackjack driver 26 data of this transaction for subsequently outputting to the player. Following this step, in step 496, the blackjack driver 26 requests the blackjack player evaluator 34 to provide an initial blackjack game configuration for the new blackjack game. Subsequently, in step 500, the blackjack player evaluator 34 responds with an initial blackjack game configuration, wherein this configuration includes the initial card representation for the player's hand (as shown, for example, in area 292 of FIG. 2). Note that this initial card representation is the most recent card representation provided to the blackjack player evaluator 34 by the card generator module 38. Thus, note that if two player requests to commence a new blackjack game were transmitted to the blackjack driver 26 in rapid succession, then step 500 may be performed for each of the requests before the dealer module 38 outputs a new random card representation to the blackjack player evaluator 34. Consequently, in such a case both players will be presented with an identical initial card representation for the player's hand. Subsequently, in step 504, the blackjack driver 26 stores information regarding the identity and initial configuration of the new blackjack game for the player in the database system 28. In particular, a blackjack game identifier for the new game is stored and associated with the identity of the blackjack player and the tournament to which the game is associated. Following step 500, in step 504, the blackjack driver 26 stores information regarding the new blackjack game for the player in the database system 28. In particular, the following information is stored regarding the initial configuration of the new blackjack game: the player's identity, the identity of the tournament for which the new game corresponds, and identifier identifying the new game, and an initial configuration for the new blackjack game including card representations and any initial required bets. Further, note that throughout the course of each blackjack game played by a player, the blackjack driver 26 and the wager accounting module 30 update information in the database system 28 as the game configuration changes due to interactions between the player and the blackjack game controller 14. Thus, for a blackjack game underway, each request from a player for continuing the game with a next play, need not provide the entire game configuration to the blackjack game controller 14. Instead, only sufficient information is required in the request for the blackjack driver 26 and/or the wager accounting module 30 to retrieve information related to the blackjack game configuration corresponding to the player's request. Following step 504, in step 508, the blackjack driver 26 outputs an initial blackjack game configuration for the new game to the player at his/her Internet client node 318 (gaming station 18). Subsequently, the flow of control once again returns to step 424 to await a next player input to the controller 14.

Returning now to step 480, if it is determined here that the player request is not to commence a new blackjack game in a current tournament, then step 520 is encountered wherein a determination is made as to whether the player request is related to a play in a currently active blackjack game. If not, then in step 524 the blackjack game controller 14 processes miscellaneous requests such as, for example, a request for special blackjack rules relating to a current game and/or tournament, the number of players remaining in the current tournament, the player's ranking in the current tournament, and the prizes for winners of the current tournament. Subsequently, assuming such miscellaneous requests are responded to, in step 524, the flow of control for the present flowchart returns to 424 to await a next player input.

Alternatively, if in step 520 the player request is related to a play in a currently active blackjack game, then in step 528 a further determination is made as to whether the player request is for a new card representation. If so, then in step 532, a determination is made as to whether the card request is for the house or for the player. If the card request is from the house, then in step 536 the blackjack driver 26 communicates with the house blackjack playing module 42 for obtaining a new blackjack game configuration for the current blackjack game, wherein the new game configuration includes the most recently output card representation from the card generator module 38 as the next card representation in the house hand for the blackjack game from which the current player's request came. Subsequently, in step 542 the house blackjack playing module 42 outputs blackjack game configuration information indicating the new house hand card representation and any player response(s) that the player may exercise in responding to the new blackjack game configuration.

Upon receiving the house blackjack playing module 42 output, in step 546, the blackjack driver 26 determines whether there is a further player response in the present game by invoking one or both of the blackjack player evaluator 34 and the blackjack hand evaluator 46. If there are additional possible player responses, then in step 550 the blackjack driver 26 outputs a blackjack game configuration to the player at his/her Internet client node 318 (gaming station 18) so that the player may exercise one of his/her available game options. Subsequently, having processed the player's request the flow of control again loops back to step 424 to await a next player input. Alternatively, if in step 546 the blackjack driver 26 determines that there are no further possible player responses, then the current blackjack game is complete and the blackjack driver 26 in step 556 activates the blackjack hand evaluator 46 for evaluating the blackjack game hands so that the blackjack hand evaluator can activate the wager accounting module 30 to update the player's account (according to the results of the blackjack game) in the database system 28. Following this step, in step 560 the wager accounting module 30 outputs to the blackjack driver 26 updated accounting information to be provided to the player. In step 564, the blackjack driver 26 outputs the results of the blackjack game and the players updated account information to the player. Also, note that the blackjack driver 26 updates the database system 28 regarding the completion of the present blackjack game as well as any further status information related to the player and the tournament to which the present blackjack game is associated. Subsequently, having processed the player's request, the flow of control again loops back to step 424 to await a next player input.

Alternatively, if in step 532 it is determined that the player's request is for a new card representation for the player, then in step 568 the blackjack driver 26 activates the blackjack player evaluator 34 for obtaining a new blackjack game configuration for the current blackjack game, wherein the new game configuration includes the most recently output card representation from the card generator module 38 as the next card representation for the player's hand(s). Subsequently, in step 572 the blackjack player evaluator 34 determines the next blackjack play options the player may exercise for the present game and then outputs the new blackjack configuration with these options to the blackjack driver 26. Following this, the steps 546 and subsequent steps are performed as described above.

Returning now to step 528, if the player request is not for a new card representation then step 576 is encountered wherein the blackjack game controller 14 processes other blackjack player game requests such as requests for additional bets, cancellations of bets, a request to stand on a particular player hand, a request to split a pair of card representations, or a request for insurance. Assuming that such requests as described above are processed, in step 580 the blackjack driver 26 subsequently outputs a new blackjack game configuration to the player according to the processing performed in step 576. Also, note that the blackjack driver 26 updates the database system 28 with information relating to the new blackjack game configuration so that it may be retrieved upon a subsequent player request relating to the present game. Following this step, the flow of control for the present flowchart loops back to step 424 to again wait for another player input.

FIG. 5 presents a simple example of the operation of the present invention for playing blackjack wherein four blackjack games are shown being played asynchronously with the blackjack game controller 14. To describe FIG. 5 in detail, note first that the row of numbers 604 across the top of the figure represents a sequence of values of successive card representations output by the card generator module 38. That is, in a first time interval a card representation having a value of three is output, in a second time interval a card representation having a value of five is output, in a third time interval a card representation having a value of seven is output and so on across the row. Below row 604 are blackjack game rows 606, wherein each blackjack game row 606 represents a series of events that occur in each blackjack game 610 through 626 over the course of time corresponding to the series of card values 604. In particular, the numerical entries within each blackjack game row 606 correspond to the values of the player and house card hands as additional cards are added to the player and house hands of each blackjack game. For example, referring to blackjack game row 610, assuming this blackjack game commences with the player's hand obtaining the card representation for the leftmost card value of the sequence 604 (i.e. the value three), the player's hand has a corresponding value of three. Subsequently, if the house blackjack playing module 42 is activated for this game to output (i.e. deal) an initial card representation to the house during the second time interval (i.e. the card generator module 38 has output a card representation of five), then the house hand initially has a value of five. Subsequently, if in the third interval the player for blackjack game 610 provides a request for another card, then the card representation corresponding to the value of seven in sequence 604 is provided to the player and therefore the player's hand has a total value of ten. Following the incorporation of the seven into the player's hand, this blackjack game is delayed so that the next time interval corresponding to the value of two in sequence 604 is not dealt to either the player or the house in blackjack game 610. Note that it is an important aspect of the present invention that card representations generated by the card generator module 38 are only incorporated into a particular blackjack game when a request for such a card representation is made during the time the card representation is the most recent output from the card generator module 38. Thus, one or more card representations output by the card generator module 38 during a blackjack game may not be used in the game. More precisely, it is typical (although not shown in the example of FIG. 5) that substantially any length or subsequence of consecutive card representations output by the card generator module 38 may be ignored within a given blackjack game due to time delays occurring in the game. Thus, in some circumstances such delays could be as long as a number of days if the player, for example, did not request another hit during such a time interval.

Continuing now with the remaining plays of blackjack game 610, note that in the fifth time interval the player requests a hit thereby obtaining a card representation having a value of nine and thus obtaining a player's hand value of nineteen. Subsequently, the house takes hits for the next two consecutive card representations having values eight and ten respectively. Thus, the house hand busted when the value of twenty-three was obtained for the house hand.

Blackjack game rows 606 for blackjack games 614 through 626 may be interpreted similarly to the description above for blackjack game 610. Note however that each of these games commence at a different time interval in that each game commences with a different card representation taken as the first hit for the player's hand. That is, the first card representation dealt in each of the blackjack games 610 through 626 is different and further each of the card representations requested corresponding to values of the sequence 604 is different for each blackjack game. Therefore, substantially every blackjack game, even if played concurrently with other blackjack games, will have unique player hands and house hands. Thus, not only can a large number of asynchronous blackjack games be played simultaneously head-to-head with the house, but also there may be a greater degree of confidence by the blackjack players that the house is not manipulating card representations in that blackjack players may substantially determine the timing for substantially all hits in a blackjack game (for both the player hand and the house hand) and thereby reduce any suspicions that the card representations are being manipulated. Moreover, in one embodiment, the players may request the sequence of card representations that were generated during the course of a game.

Note that the present invention also may include other blackjack variations as well. In particular, referring to step 416 (FIG. 4A) again, instead of generating card representations at regular intervals, this step may simply activate the card generator module 38 so that it generates a substantially random card representation on demand whenever a request for a new card representation is made (e.g., steps 536 and 568).

Additionally, in another blackjack variation, particularly suited for tournament blackjack where each player can be monitored, the players play each play of a blackjack game synchronously as blackjack is typically played with a human dealer in casinos. However, in the present variation, each player is provided with the identical card representations for their initial cards. Subsequently, each player hand and the house (i.e., dealer) hand varies between players only when players play their blackjack hands differently. That is, for each synchronously played blackjack game among a plurality of players, the same sequence of card representations is available to each player and the house blackjack playing module 42 so that, for example, the dealt card representations in each game between one of the players and the house blackjack playing module are identical for players playing the same sequence of plays throughout the game. Accordingly, as one skilled in the art will appreciate, for each blackjack game, it may be necessary for the card generator module 38 to maintain a predetermined sequence (or ordered collection) of card representations throughout the game so that players playing differently may be dealt an appropriately sequenced card representation. Moreover, it may also be necessary for the house blackjack dealer playing module 42 to provide sufficient control information to the card generator module 38 so that the card generator module can respond with the appropriate card representation from the predetermined sequence.

Figure 6A:
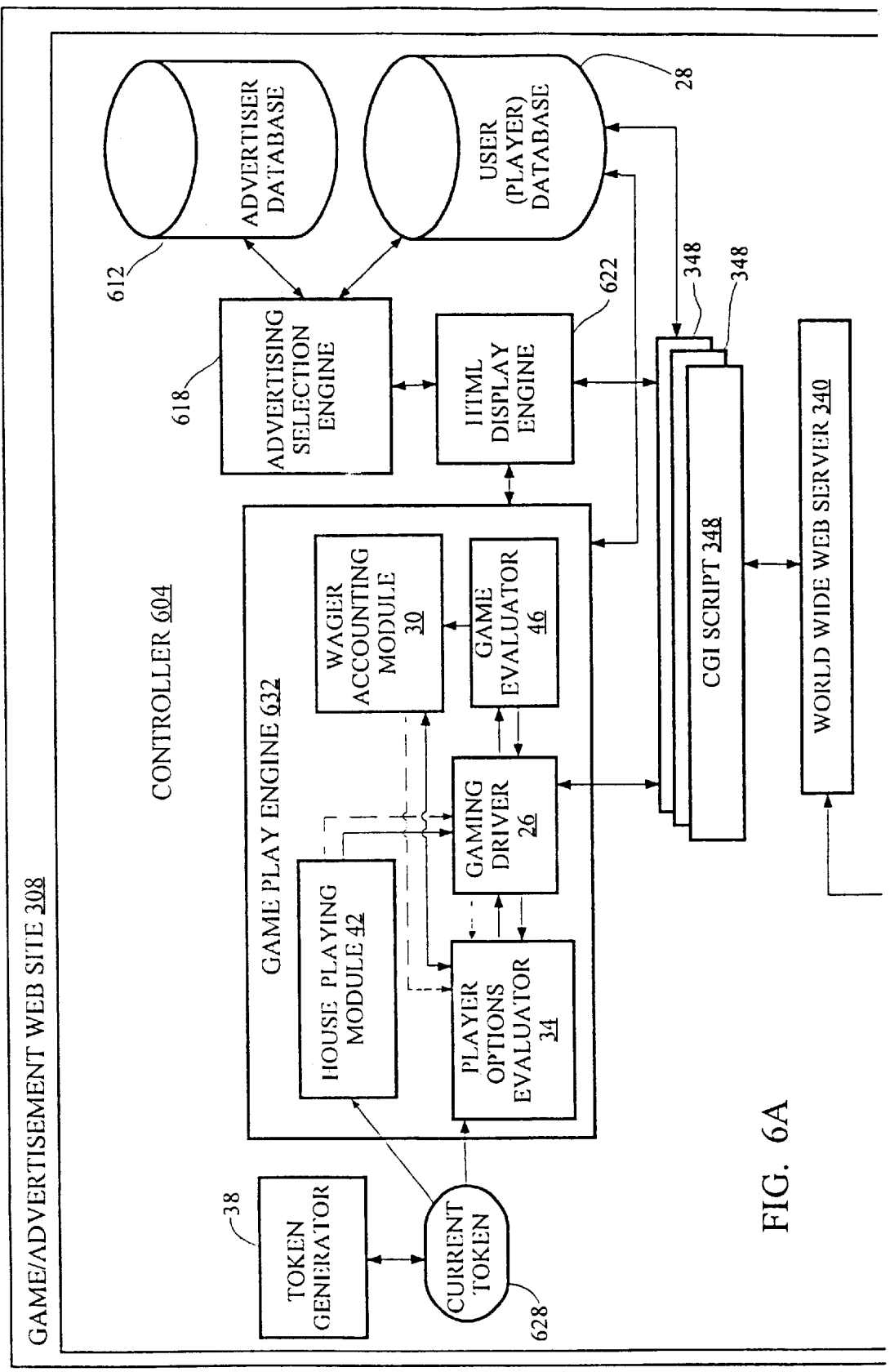
FIGS. 6A and 6B are a block diagram of an Internet embodiment of the present invention.
Figure 6B:
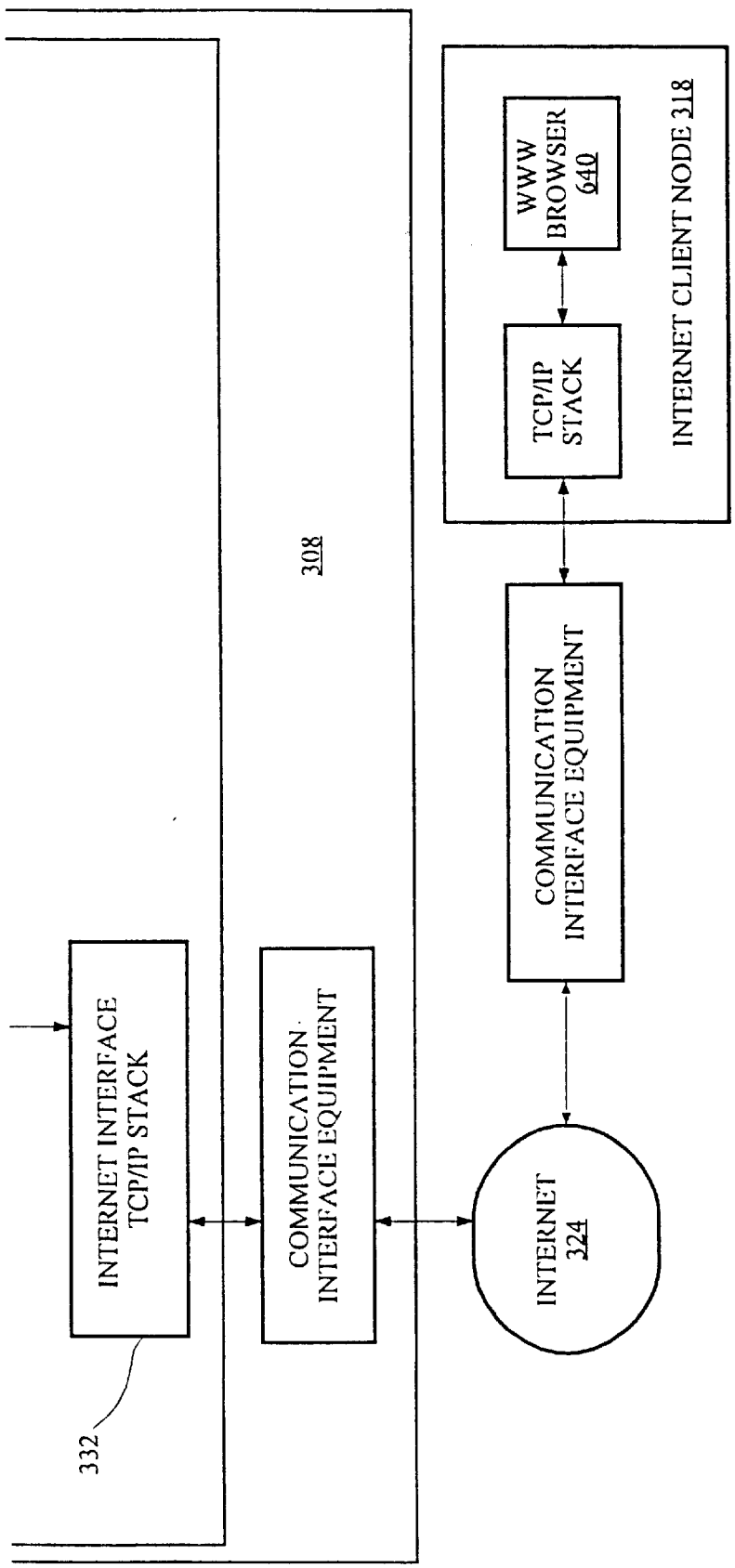

Another embodiment of the present invention is presented in FIGS. 6A and 6B, wherein this embodiment is enhanced for presenting sponsor or advertiser product and/or service advertising to qualified players that adequately match a predetermined player profile such as a demographic profile of a particular group of players. Accordingly, in FIGS. 6A and 6B, there is a game/advertisement controller 604 for providing substantially the same functionality as the blackjack game controller 14 (FIG. 3) except that games other than blackjack may also be played (such as poker, craps, pai gow and roulette). Additionally, the game/advertisement controller 604 also performs functions related to matching particular advertising with the users (i.e., players) playing the various games provided by the game/advertisement web site 308, wherein each user communicates with the web site 308 on a corresponding Internet client node 318 (alternatively interactive cable television node). That is, the present FIGS. 6A and 6B present the high level modules for matching players having desired user characteristics (e.g., profiles) with advertising from sponsors or advertisers requesting players with such user characteristics. In particular, only the players with such desired profiles qualify for receiving a particular advertisement and/or promotional (i.e., advertising) from a particular sponsor or advertiser. Accordingly, it is an aspect of the present invention that various criteria may be used to make such a determination as to which players (or, more generally, users) receive which advertising. For example, one or more of the following attributes may be used in matching users with advertising presentations:

(8.1) age,
(8.2) sex,
(8.3) financial status,
(8.4) location or residence,
(8.5) education,
(8.6) marital status,
(8.7) amount of recreational time,
(8.8) personal tastes and/or habits (e.g., smoker/non-smoker, preferences for sports, movies, liquor, foods, clothes, vacations, cars, etc.),
(8.9) size of household,
(8.10) number of children, and
(8.11) categorizations of users according to network interactions such as the type of web sites accessed, the type of advertising for which the user seeks additional information, the risk tolerance in playing games such as blackjack.

To provide (or, match) particular users with particular advertising, data (or user information items) on each user is maintained in the form of a user profile in the user (player) database 28 which is an enhanced version of the blackjack player registration and playing status database 28 of FIG. 3. The user profiles are populated with such user related information as in (8.1) through (8.11). This information is obtained when users register at the web site 308 when users respond to explicit questions subsequently asked of them, or by monitoring the network activities of users. Note that user profiles may vary in length, depending on the amount of information obtained on each user. Moreover, different types of information may be obtained for different types of users. For example, for users having assets of more than one million dollars, these users may be requested to enter their favorite vacation destination location since this may be important for certain advertisers. However, for users whose assets are less than forty thousand dollars, no such information may be obtained since the information would be likely irrelevant to any advertiser. Thus, in one embodiment of the user profiles, each user profile has a variable length section for storing user information items not uniform across all users. Moreover, in such an embodiment, each user information item stored in the variable length section may be considered as a pair, wherein the first component of each pair indicates or references a question, user attribute, or user classification to which the second component provides an answer or value related to the first component. Thus, for example, for a particular user, an information item may provide the pair: (4, "Madrid"), wherein "4" identifies the attribute: "favorite vacation destination location," and "Madrid" is the value for this attribute, as one skilled in the art will understand.

Alternatively, data related to the advertisers or sponsors may reside in a different database, the advertiser database 612. Accordingly, this database stores demographic profiles which, in one embodiment, have a data structure substantially identical to the user profile data structure. Such demographic profiles may have a variable length section for specifying requested values for user information items that may be provided in (potentially only a relatively small number of) user profiles. In some embodiments, a demographic profile includes a reference to the advertiser's or sponsor's identity, a reference to the advertising to be presented and a variable length section of demographic item pairs, wherein the first component of each pair has the same interpretation as the first component of a user information item pair and the second component of the pair specifies a desired value or range of values that the advertiser or sponsor prefers. Further, note that, in some embodiments, each demographic item pair may have additional information associated with it such as a perceived importance of the demographic item pair to the advertiser or sponsor. Thus, such additional information may be in the form of a normalized scalar value wherein a value of one indicates that the demographic item pair is of highest importance whereas a value of zero indicates that the demographic item is substantially irrelevant to the advertiser or sponsor. Accordingly, regardless of the particular embodiment of the demographic profiles, the users' demographic profiles are used to match (i.e., select) one or more corresponding advertising presentations with a particular target group of users that, presumably, are likely to purchase the product and/or service portrayed in such advertising presentations. Thus, since such advertising presentations may be provided to only users who are likely to be subsequent customers, advertisers and/or sponsors may provide to these users specifically targeted advertising having relatively expensive promotionals such as product or service discounts, free samples, or a trial usage.

Accordingly, to perform the selecting or matching of users with such demographic profiles, for each user, the user profiles stored in the user database 28 are compared with the demographic profiles by the advertising selection engine 618. Note that there are numerous techniques for performing such a comparison for selecting a group of users. In particular, a precise match may be required between each demographic item pair and a corresponding user information item pair so that the second component of the user information item pair is (within) a desired range as specified in the corresponding demographic item pair. Alternatively, various weighting statistical techniques may be used for determining a "similarity" measurement when not all demographic pairs are required to precisely match a demographic profile. In one embodiment, the similarity measurement may be provided by a statistical analysis module that determines the users that most closely match the corresponding demographic profile for an advertising presentation. Thus, in order for a user to be selected, the similarity measurement between the user's profile and a corresponding demographic profile may be required to be above a predetermined threshold. Additionally, note that the advertising selection engine 618 may perform the matching of users with advertising presentations as a background or non-real time process so that, for example, for each user profile in the user database 28, there is a related table identifying the advertising presentations that are candidates for presentation to the corresponding user when, for instance, this user communicates with the game/advertisement web site 308.

Moreover, it is important to note that at least in one embodiment of the present invention, the advertising selection engine 618 may, for a particular demographic profile, periodically re-evaluate user profiles in the user database 28 for reselecting the group of users to which an advertising presentation is to be presented. Thus, users previously selected may be requalified or disqualified and users previously disqualified may be now qualified for selection due to, for example, an enhanced user profile.

Accordingly, the present invention may commence or cease transmitting a category of advertising to a user whose user profile is enhanced with additional information. For example, if a user indicates that he/she is currently considering the purchase of a new car, then adverting for purchasing a car may be transmitted to the user. Alternatively, once the present invention is notified that, for example, a car has been purchased or that no further car advertising is are desired, then a further enhancement of the user's profile may be performed so that no further advertising from the category of car advertising is transmitted to the user.

Note that the present invention provides for flexibly creating, deleting and modifying categories of advertisements by providing techniques for linking demographic item pairs that are similarly related to a category record or object. Thus, at least the following advertising categories may be provided by the present invention: sports categories (e.g., baseball, soccer, hockey, etc.), food related categories (e.g., restaurants, grocery stores, food items), exercise related advertising (e.g., bicycles, in-line skates, skiing), insurance related advertising (e.g., auto insurance, life insurance), political related advertising (e.g., for or against a particular political candidate), and geographical related advertising (e.g., for users living in a particular area such as the Denver metropolitan area). Thus, the advertising selection engine 618 supplies the selected advertising presentations to the HTML display engine 622 for translating this data so that it may subsequently be included in an HTML output to the user by the common gateway interface 348.

More precisely, the selected advertisement data is joined in the HTML display engine 622 (at least in one operation of the present invention) with a token 628 representing, for example, a gaming card (for a current user game) that has been issued by the token generator (module) 38, this generator being an enhanced version of the card generator module 38 of FIG. 3. The generated token is supplied initially to the game play engine 632 for processing user gaming requests according to the rules of the game being played. That is, the game play engine 632 determines, for each available game: (a) how each token may be "played"; (b) who receives the token, for example, the user or the house playing module 42; and (c) the result of playing the token. Note that in one embodiment, the token generator 38 generates tokens on request by, for example, the house playing module 42 and/or the player options evaluators 34, wherein the tokens generated are appropriate to the game being played. Alternatively, in another embodiment, the token generator 38 may generate random tokens and the game play engine 632 transforms the tokens into appropriate randomized values for the games offered, as one skilled in the art will appreciate. Furthermore, other embodiments for supplying randomized tokens to a plurality of different games are within the scope of the present invention. Additionally, the game play engine 632 contacts the player database 28 to maintain the status of the user in relation to the particular game being played as well as the user's relationship to all of the other users (if, for example, the user is involved in a tournament offered at the game/advertisement web site 308). Note that, as one skilled in the art will appreciate, in one embodiment of the game play engine 632, its internal modules provide a similar architecture and functionality to the correspondingly labeled modules of FIG. 3, albeit additionally, for games other than blackjack (e.g., "head-to-head" poker, craps, roulette, and pai gow).

The common gateway interface or CGI scripts 348 transfer data between the HTML display engine 622 and the World Wide Web server 340 which, as one skilled in the art will understand, may be a plurality of high level executable programs as discussed in the description of CGI scripts 348 for FIG. 3. The World Wide Web server 340, in turn, transfers the data to the Internet TCP/IP stack 332 that interfaces with the Internet 324 for transferring the data to an intended Internet client node 318 having an appropriate World Wide Web browser 640.

The present embodiment maintains information on the status of games being played and user responses to advertising in the user database 28. Moreover, additional advertiser specific information (e.g., desired demographic profiles, advertisements, promotionals, and information related to user responses) is provided in the advertiser database 612. Accordingly, as discussed above, the demographic profiles in the advertiser database 612 may include schemas or templates having fields for designating one or more of the attributes (8.1) through (8.11). Moreover, the databases 28 and 612 may maintain records of various types of pertinent statistics such as: (a) the advertising presentations presented to each user; (b) the time, date and number of presentations of a particular advertising presentation; and (c) the detected user responses to the advertising. Thus, this information may provide advertisers or sponsors with enhanced feedback as to the efficacy of their products, services and presentations thereof. For example, an advertiser may be able to query the user and advertiser databases 28 and 612 to obtain such feedback as:

(9.1) who has seen a particular advertisement;
(9.2) when it was seen;
(9.3) the number of times the advertisement was accessed:
  (a) by any particular user;
  (b) by all users; and
(9.4) the number of favorable and/or unfavorable responses.

Figure 7:
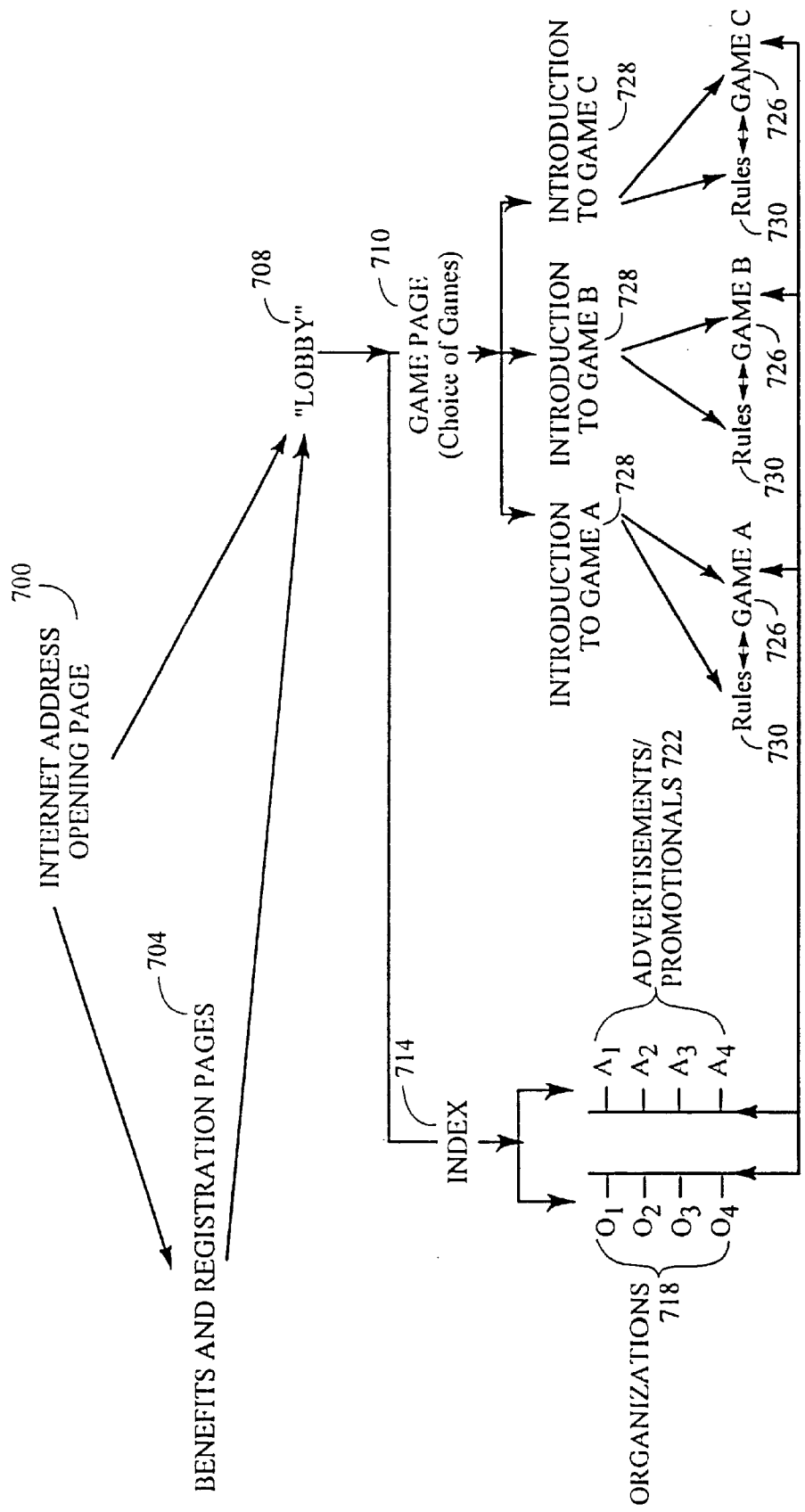
FIG. 7 is a diagram illustrating how a user navigates through web pages of the World Wide Web for accessing the game/advertisement web site 308 (FIG. 6) functionality.

Referring now to FIG. 7, a diagram is presented providing one embodiment of the access routes or paths users navigate in accessing the features of the game/advertisement web site 308. In particular, upon initiating Internet contact with the game/advertisement web site 308, a user is first presented with the opening page 700 identifying the web site 308. Subsequently, the user can access the benefits and registration pages 704 for viewing general information related to web site 308 and also for registering at the web site (as is discussed in further detail below). Alternatively, the user may access one or more "Lobby" pages 708 to view the gaming and information exchange capabilities as, for example, provided by advertisers. Assuming the user is registered at the game/advertisement web site 308, the user may proceed from the LOBBY 708 to the game page 710, wherein a game 726 or game rules 730 can be selected for playing, via the introduction to game pages 728. Alternatively, the user may instead access one or more index pages 714 having, for example, listings of organizations to which the user may be allowed to access depending on the affiliations of the user (e.g., a member of a particular membership discount store chain). Additionally, from the index page(s) 714 substantially any user may access an advertisement or promotional provided by an advertiser on an advertiser page(s) 722. However, it is an aspect of the present invention that information related to certain promotionals provided by advertisers or sponsors are restricted. That is, such promotionals may be only presented to users having a demographic profile that has been determined by the present invention to be sufficiently compatible with a desired user profile for the advertiser or sponsor to warrant providing such a promotional. Thus, the present invention provides access to certain advertiser promotionals only to "qualified" users who are, for example, considered likely subsequent purchasers of the advertiser's products and/or services. Additionally, such promotionals may also be presented to users who express an interest in a particular product or service advertised. For example, users who (a) request additional or supplemental information related to an advertised item, or (b) provide a favorable response to such advertising (by, for instance, indicating a preference for an advertised item), or (c) respond to a questionnaire related to personal information or marketing survey information may also be provided with information regarding promotionals. Thus, advertisers or sponsors may offer relatively substantial or expensive promotionals via the present invention to such users as well. Moreover, the present invention may also utilize such demographic profiles to prohibit a user not sufficiently matching such a demographic profile from gaining access to a corresponding promotional. Accordingly, in one embodiment of the present invention, when the user accesses an advertiser page 722, the user's profile (in the user database 28) is compared with the demographic profiles in the advertiser data base 612 for determining any promotionals that can be presented to the user.

Moreover, from the index page 714 the user may be provided with the ability to link into various web sites or web site pages. That is, the user may be provided with the ability to link into another web site or web page at any time a link is made available (typically a hypertext link). Additionally, note that similar links may be accessible by users while playing a game 726. However, these links may generally hyperlink the user to an advertiser page 722 within the game/advertisement web site 308 so that the user may be exposed to further information and/or presented with promotional options for an advertised item. For instance, certain advertising hyperlinks may be integrated into the presentation of plays of a game 726. Accordingly, since an aspect of the present invention is to repeatedly integrate different advertising presentations (and any related hyperlinks) into the play of a game 726, a user may repeatedly be enticed to seek out additional information about different products or services by activating the related hyperlinks. Moreover, it is also an aspect of the present invention that when such hyperlinks provide the user with access to a different web site, that at least a portion of the display of the user's Internet client node 318 maintains a graphical format associated with the game/advertisement web site 308, and that the user may leave and return to the web site 308 without the user being aware of accessing another web site. Moreover, by monitoring user input related to an advertising presentation, the present invention is able to provide feedback to an advertiser as to, for example, the number of times the advertising presentation is accessed by users for such additional information about products or services.

Also note that some advertisements (presented via advertiser pages 722 or as part of a game play presentation) may be interactive with the user wherein the user may perform a transaction such as making a reservation (e.g., an airline or hotel reservation). Further, a user may be given the opportunity to provide positive and negative opinions or responses on, for example, various advertisements, promotionals and other related matters by expressing such responses upon accessing advertisement related information. Thus, it is an aspect of the present invention to be able to conduct "test marketing" in that statistically representative groups of users may be selected for determining:

(10.1) the efficacy or appeal of one advertisement in comparison to another advertisement for a particular advertised item;

(10.2) the profile of the users that are responsive to a particular advertising presentation; and/or (10.3) whether a particular group of users, for example, having similar user profiles favorably respond to a particular advertising presentation. For example, the present invention may determine such a response: (a) by detecting an activation of a hyperlink, (b) by detecting a response to questions presented, and/or (c) by determining the length of time the advertising presentation is displayed or visible.

Accordingly, input response data may be transmitted to the game/advertisement web site 308 and retained for subsequent statistical evaluation. Thus, resulting aggregate statistics can be made available to, for example, advertisers or sponsors, thereby preserving the privacy of the users. In particular, statistics may be made available for:

(11.1) providing information about, for example, the efficacy of certain advertising presentations (e.g., the number of positive responses to such presentations and/or the number of advertised items sold directly through the advertisements at the game/advertisement web site 308);

(11.2) providing information related to the number and profile of users accessing certain advertising presentations;

(11.3) determining measurements related to the number of different (groups of) users to which an advertising presentation has been presented;

(11.4) determining the total number of presentations of a particular advertisement;

(11.5) determining the cost of advertising presentations to the advertisers and billing the advertisers for such costs according to, for example, at least one of: (a) the number of users to which an advertisement is presented, (b) the number of promotionals requested or (c) the number of network user communications (i.e., hits) with the web site 308;

(11.6) determining if an advertising presentation should be discontinued because the advertiser's cost limits have been reached, such limits being, for example, related to a total number of presentations of an advertising presentation. Note that, in one embodiment, it is an aspect of the present invention to charge an advertiser for each presentation to a user; or (11.7) determining which of an advertising presentation and a different second advertising presentation (from the same advertiser) is most effective when both are provided to various selected (groups of) users, so that the advertiser or sponsor may then have a basis for choosing the most appropriate of the two advertising presentations in future advertising.

Additionally, it is an aspect of the present invention that it may also maintain statistics (and/or related information) for:

(12.1) providing "real time" game rankings of users (players) involved in a gaming tournament provided by the game/advertisement web site 308. Note that such rankings may be provided to a user so that he/she may know his/her standing and the number of players remaining in the tournament; and (12.2) providing a "style of personality" of the game playing users so that, for example, a risk tolerance of such users may be estimated and used to determine if a particular user might be interested in a particular product or service. Thus, such "style of personality" statistics for a user may be stored in the user's profile. For example, the information captured here may include: average size of wager, average size of wager in comparison to the total amount that could be wagered, length of time playing in a single session, the ratio of the number of wagers on high risk plays presented, and the skill of the player.

Accordingly, the following aspects of the present invention are noteworthy:

(13.1) the user may be provided with free access or reduced cost access to other areas of the Internet 324 upon viewing the presentations of certain organizations and/or advertisers. Note that the ability to reduce the cost of accessing the Internet may act as a vehicle for attracting various users;

(13.2) the index page 714 gives a user the opportunity to access a particular organization (e.g., organizations 718) that the user may belong to or any particular advertiser (e.g., advertisers 722) without going through any games although the user may be required to go through the "LOBBY" page(s) 708 and thereby be exposed to advertising and/or the opportunity to join a game;

(13.3) a user may also be able to go from an initial organization page 718 to an introductory game page 728 (e.g., for a game 726) but, unless authorized, may not be provided with further access to the organization's web pages or the game;

(13.4) while playing a game 726, the user has the ability to access further information related to an advertisement or promotional being presented;

(13.5) during the playing of a game 726 (e.g., blackjack), the user may be allowed to review and/or stepwise replay a previous portion of a game 726 during a current gaming session;

(13.6) when in a particular organization page 718, the user may be required to return to the index page 714 before linking into an advertiser 722 unless a direct link has been provided for some reason on the particular organization web page. Moreover, the user may access the game page 710 from the index page 714 and vice versa;

(13.7) a user may either go directly into playing a particular game 726 (as authorized) or to a rules section 730 for reviewing the rules for the corresponding game 726. Note that a user may always access the rules section 730 during the corresponding game 726;

(13.8) there is a help feature for providing information such as:

a) how to do some particular action or the reason for some action or the reason an action is blocked. For example, the reason for an inability to access a certain web page, the reason for an inability to make a particular game play, such as a bet, stand or hit in the game of blackjack and/or the reason for a particular result of a certain bet, hit, stand or other user play in a game such as blackjack;

b) for contacting a gaming referee for resolving gaming conflicts. Such a referee will be available to resolve any dispute. Note that the user can notify the management operating the present invention of a problem via, for example, notification forms displayed when a notification button is activated.

Figure 8A:
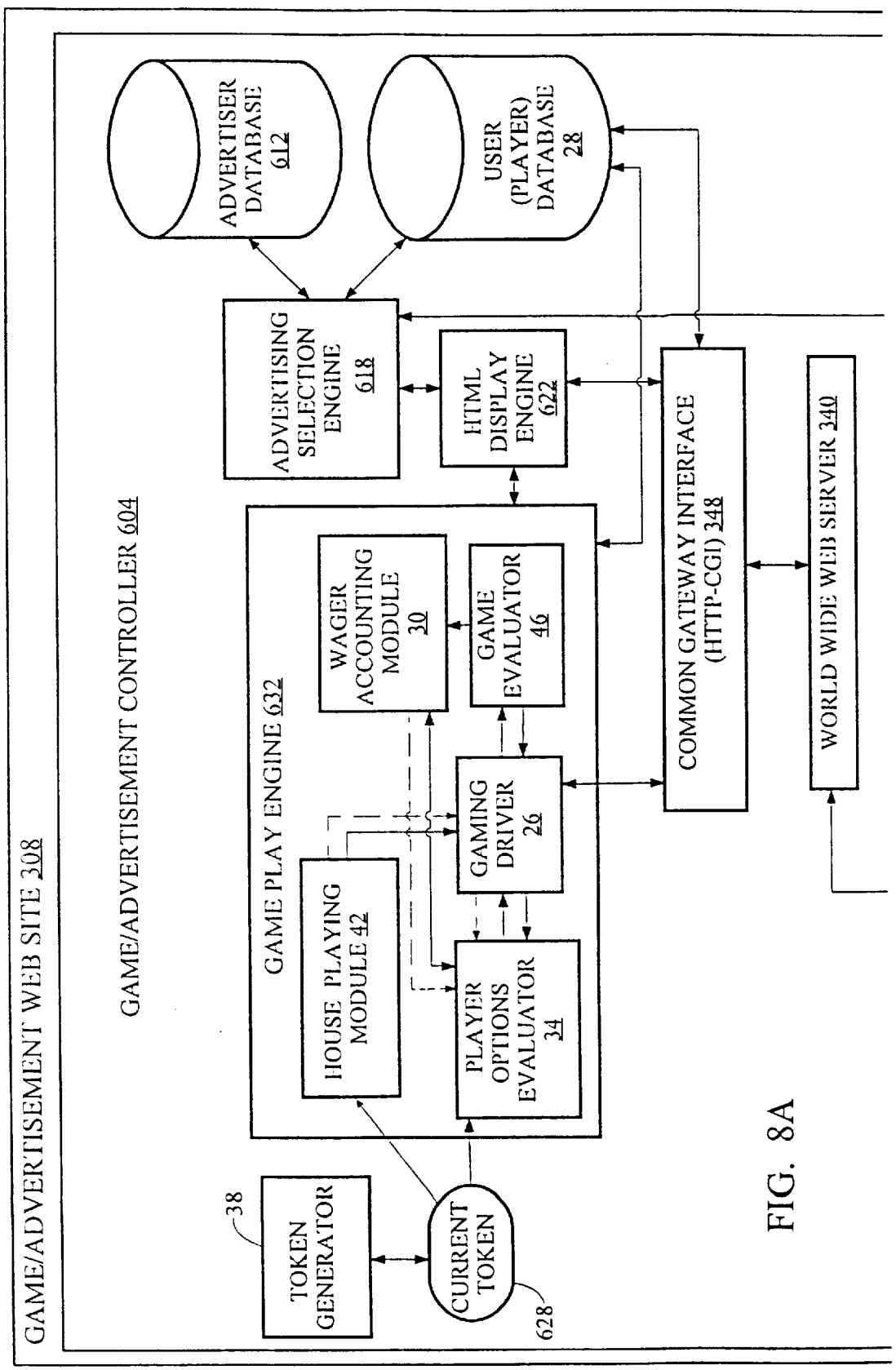
FIGS. 8A and 8B are an alternative embodiment of the game/advertisement web site 308.
Figure 8B:
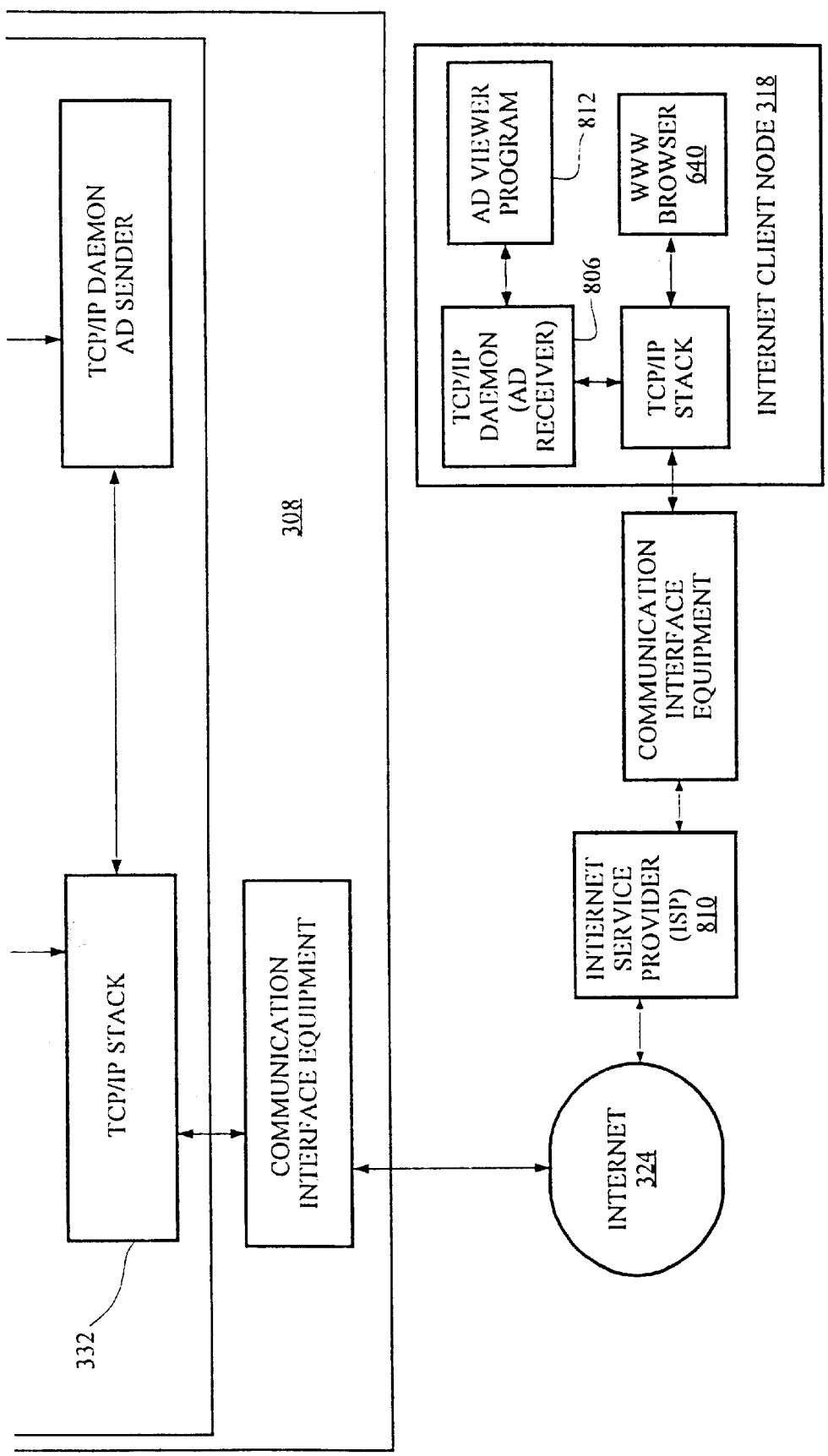

Referring now to an alternative embodiment of the present invention presented in FIG. 8, wherein the game/advertisement web site 308 coordinates with a third party Internet access service provider 810 (or interactive cable television provider) for providing Internet 324 (cable television) access to users on a reduced cost or free basis once a user has registered with the web server 340 (cable television provider). That is, the game/advertisement web site 308 contacts the user's Internet service provider and arranges to subsidize the user's Internet service charges in return for the gaming advertisement web site 308 being able to repeatedly download to the user's Internet client node 318 (or alternatively, interactive cable television node), unrequested information such as advertising for presentation to the user.

Accordingly, a prospective user of the present invention can sign up or register with the game/advertisement web site 308 for reduced Internet service fees by dialing into an Internet service provider 810 with normal serial dialing and after gaining Internet access, subsequently log on to the web site 308 as a user identified by the generic user identifier "NEW." Each user identified by "NEW" is forced into a connection with an enrollment or registration program so he/she can provide information requested by the present invention that can subsequently be used in determining which advertising to present to this user according to, for example, advertiser preferences. Thus, when registration is completed, the present embodiment of the invention downloads, for example, an ad viewer program 812 and a communications daemon (e.g., ad receiver daemon 806) to the user's Internet client node 318, wherein this daemon allows the game/advertisement web site 308 to download to the user's Internet client node 318 unrequested information such as advertising repeatedly. Accordingly, assuming the daemon 806 is installed, the user may access not only the gaming and advertisement services of the web site 308, but also access substantially the entire Internet through the web site 308 at a reduced cost. Thus, whenever the end user processor 318 connects with the Internet service provider 810, the game/advertisement web site 308 is alerted by the Internet service provider 810 and the DISPLAY ENGINE 622 starts up the downloaded daemon 806 via Internet communications with the user's Internet client node 318. Subsequently, the DISPLAY ENGINE 622 periodically sends selected advertising to the daemon 806. Accordingly, the daemon 806 utilizes the ad viewer program 812 to coordinate the display of the advertising presentation.

Note that various alternative embodiments related to the architecture and functionality of FIG. 8 are also within the scope of the present invention. For example, instead of communicating with a plurality of third-party Internet service providers 806 for determining when users registered with the present invention are accessing the Internet via subsidized Internet connections, the game/advertisement web site 308 may include or be related to a dedicated Internet service provider 806 so that when a user registers with the present invention, the user is provided with a new Internet access code for the dedicated Internet service provider 806 and the user's Internet access fees may be subsidized.

However, regardless of how the present invention subsidizes Internet access, the game/advertisement controller 604 is notified whenever each subsidized user connects to the Internet or disconnects from the Internet. Additionally, certain reliability features are included in the daemon 806 and ad view program 812 for assuring that advertising is indeed presented to the user. For example, there may be periodic transmissions from each subsidized user's Internet client node 318 to the web site 308 verifying that both the daemon 806 and the ad view program 812 are active. Note that whenever any advertising is received at the user's Internet client node 318, the daemon 806 transfers the advertising to the ad viewer program 812 which, in turn, converts the transmitted information to a displayable format and forces the display of the user's Internet client node 318 to present the advertising unobscured to the user.

Additionally, note that in certain contexts the DISPLAY ENGINE 622 may transmit a message to an Internet Service Provider 806 indicating that no further Internet access will be subsidized due to a predetermined number of advertising presentation display failures.

In another embodiment of the present invention, game tournaments may be provided, wherein the players of such a tournament play instances of a game on a communications network such as the Internet, a cable network, an interactive television network, or an intranet (such as in a casino). Such game tournaments provide for the playing of a plurality of instances of a game by each of a plurality of players. In general, a tournament is a multi-level structure, wherein at a first level players are grouped within the tournament into groups and the players within a group compete against one another when playing one or more instances of the game. At a higher level of the tournament, winning players from a lower level (e.g., the first level hereinabove) are partitioned into one or more groups such that for each of these new groups, the players within the group compete against one another by playing instances of the game, or, alternatively, by playing instances of a modified version wherein one or more rules of the game are changed (such as described hereinabove when discussing blackjack).

Below is a brief itemization of some of the novel tournament aspects of the present invention.

1. The participants usually register by identifying themselves in such fashion so that they may be recognized by those managing the tournament and/or the other participants as participating members of the tournament.
    a. The participants need not register by responding to all identification questions at one time that may be provided, but instead may respond to a few questions submitted at various times while the tournament is in progress.
2. Keeping score is performed by using a numeric indication, tokens, chips, or another indication of the number of credits acquired by each participant in the tournament.
3. There are game rules set forth by which the participants acquire or lose their credits for each game involved in the tournament.
    a. An objective by which a participant wins a tournament depends upon the participants acquiring or losing their credits within the rules of each tournament.
        i. The participants usually have the ability to access their scores and determine their ranking in the round or tournament they are in.
        ii. The participants may be placed into various groups wherein they operate under different rules from the other participants depending upon the group to which they were assigned.
    b. Dice, cards or other objects may be used during the game to determine the winner(s).
    c. The methods by which the tournament is operated may include a plurality of rounds in which the participants are divided into groups and the participants in each round compete against other participants in the round to determine the winner of the round.
        i. A winner(s) is similarly chosen from each round until a winner(s) is determined to be the winner(s) of the tournament.
        ii. The rounds may vary in number and size, but usually, although not necessarily, each round consists of fewer participants since only the winner(s) of each round advance into the next and final rounds.

(1) There may be situations in which the rules may allow one or more persons who have not participated in an earlier round to be placed into an advanced round.
d. The participants may or may not be questioned about their personal preferences, beliefs or attitude during the tournament, which responses may be placed into a data base for further questions or qualify them to be involved in other rounds or other aspects of the tournament. Note this aspect of the invention is similar to previous embodiments of the invention described hereinabove regarding advertising during the playing of a game.
e. The tournament may or may not include a "sudden death" or special round containing special rules for winning that differ from the rules for the tournament leading up to the special round.
f. The game rules may allow additional participants to enter the tournament after many of the other participants have qualified to be placed into an advance round by obtaining a special score that may be related to the scores of those who did advance or by complying and satisfying any other such special rules that may allow a participant to qualify to play in a tournament that is in progress and in which most or many of the other participants are playing in an advanced round of the tournament.
g. The rules may provide for a tournament within a tournament in which special rules may qualify the participants to play in and/or win a tournament which relates in some fashion to the participants and rules of another tournament that is already in progress.
  i. The rules may provide for a tournament within a tournament within a tournament in the same fashion as set forth above.
  ii. The participants may be designated as a part of a particular group wherein the success of one of the participants determines the success of the other participants in the group.
  iii. The participants may or may not have the ability to delete themselves or to be deleted and moved from one such group to another group within the tournaments.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

What is claimed is:

1. A method for conducting one or more tournaments, comprising:
   identifying players requesting to join one of the tournaments, wherein each tournament includes a plurality of instances of a game for playing by each of the players identified, wherein for each of the players, at least one of the following (a) and (b) must be satisfied for the player to complete one of the tournaments:
   (a) a predetermined number of instances of the game must be played by the player;
   (b) a predetermined amount of time must elapse between the commencement of the tournament and the termination of the tournament;
   for each tournament, the following steps are performed:
   (A1) selecting the identified players to be included in the tournament;
   (A2) grouping the players into groups, wherein for each group, the players therein compete against one another in playing instances of the game;
   (A3) determining one or more winning players for each group;
   (A4) establishing a modified version of the game by changing a rule of the game while retaining another rule for the game;
   (A5) combining the winning players from different groups into one or more new groups for competing against one another in playing instances of the modified version of the game.

2. A method as claimed in claim 1, wherein at least some of the steps of claim 1 are performed by transmitting communications on a communications network, wherein each player communicates with a game playing node on the communications network by using a network node spaced apart from each of the other players.

3. A method as claimed in claim 2, wherein said communications network includes a portion of one of an Internet network, a cable television network, an interactive television network, and an intranet.

4. The method as claimed in claim 1, wherein said game includes a card game and further including the steps of:
   generating electronic card representations for playing the card game;
   receiving player identification information prior to at least a first of the players playing the card game wherein said identification information is used to identify additional information related to the first player for use in subsequent instances of the card game;
   first playing a first instance of the card game in one of said tournaments, between the first player and a substantially electronic dealer module, wherein said game playing module is dealt a first sequence of said card representations;
   second playing a second instance of the game between a second of the players and said dealer module, wherein said first and second card game instances overlap in time and wherein said module is dealt a second sequence of card representations for playing said second instance of the card game;
   wherein said first and second sequences dealt to the dealer module have at least different card representations in at least one identical card representation position, in each of said first and second sequences.

5. The method as claimed in claim 1, wherein said game includes a card game for playing electronically, further including the steps of:
   generating one or more card representations for playing the card game;
   first playing a first instance of the card game in one of said tournaments between a first of the players and a dealer module, wherein the first player receives a first sequence of card representations;
   second playing a second instance of the card game between a second of the players and the dealer module, wherein said first and second card game instances overlap in time, and wherein the second player receives a second sequence of card representations;

wherein, for an initial series of one or more plays by said first player using said first sequence, when said second player also initially plays said initial series of one or more identical plays using said second sequence, then for corresponding identical plays by said first and second players, their corresponding hands of card representations are identical.

6. The method as claimed in claim 1, wherein advertising related information is provided while playing the instances of said game on a communications network, further including the steps of:

performing the following substeps (A1) through (A3) for each of a plurality of the players:

(A1) providing, in response to a request on the communications network by the player, access to an instance of the game for playing by the user, wherein the instance includes a plurality of player plays;

(A2) transmitting one or more advertising related presentations to the player for presentation during a playing of the instance of the game, wherein for at least a duration of time between a pair of some of the player plays, a first of said one or more advertising related presentations is presented to the player, wherein said first advertising related presentation was not presented to the player during the instance of the game between a different pair of some two of the player plays, and wherein for at least one of said advertising related presentations, (a) and (b) following hold:

(a) said at least one advertising related presentation has associated therewith network linking information identifying a corresponding one of a plurality of nodes connected to the communications network, said network linking information being identical for transmissions of said at least one advertising related presentation for at least most of the players; and (b) said at least one advertising related presentation is capable of providing a responsive transmission for transmitting on the communications network, corresponding data related to one or more responses by the player to said at least one advertising related presentation;

providing advertising related information to a first advertiser for said at least one advertising related presentation, wherein said advertising related information is obtained using said corresponding data for said at least one advertising presentation.

7. The method as claimed in claim 1, wherein said game includes at least one of the following attributes:

(a) an element of chance;

(b) a total number of possible game plays is capable of being determined before playing the game; and (c) there is an opponent to at least one of the players.

8. The method as claimed in claim 1, wherein a presentation is provided to each of one or more of the players playing in one of said tournaments on a communications network, further including the steps of:

performing for each of the players, steps (A1) through (A3) following:

(A1) providing access to a network server node for allowing network access to a network service, wherein said network server node presents one or more interactive service presentations to each player: (a) during an activation of the network service from a network client node via the network, and (b) substantially a synchronously from most other players, said interactive service presentations providing interactive communications between the player and said network server node via the network;

(A2) presenting concurrently with the interactive service presentations at the network client node, a first advertising presentation for providing information related to one of a purchasable product and a purchasable service, wherein said first advertising presentation is transmitted during the activation of the network service, and said first advertising presentation is capable of being replaced by a different, second advertising presentation for presenting during the activation of the network service, and wherein at least one of said service presentations for presenting on the network client node is determined without regard to which one of said first and second advertising presentations are also transmitted to the player for concurrent presentation;

(A3) receiving data, via a communication on the network, indicative of an action by the player in response to said step of presenting; and evaluating, using said data, an effectiveness of at least one of said first and second advertising presentations.

9. The method as claimed in claim 1, wherein one of said tournaments is played on a communications network, further including the steps of:

receiving at a game playing node on the network, a contact by each of a plurality of players, via a corresponding node on the network for the player, for initiating a corresponding one of the game instances between the game playing node and the player's corresponding node, and at least some of said instances overlap in time;

transmitting game plays between said game playing node and a first of the players, for the corresponding instance of the game;

transmitting from the game playing node to the corresponding node of the first player, the ranking of a second of the players, wherein said ranking is indicative of a proficiency of the second player in playing the game, and said ranking is updated to present a change in said ranking while the first player is playing the game.

10. The method as claimed in claim 1, further including:

generating electronic game tokens for playing the game, said game tokens played in one or more instances of the game to affect outcomes of the one or more instances;

receiving player identification data prior to at least a first player playing one of the instances of the game, wherein said identification data is used to identify information related to the first player in subsequent instances of the game;

first playing a first instance of the game interactively with the first player and a substantially electronic game playing module, wherein said game playing module plays a first sequence of said game tokens;

second playing a second instance of the game interactively with a second player and said game playing module, wherein said first and second game instances overlap in time, and wherein said game playing module plays a second sequence of game tokens when playing said second instance of the game;

wherein said first and second sequences have at least different game tokens in at least one identical game token position, in each of said first and second sequences; and presenting to the first player, during said first instance, an advertisement capable of changing to a different advertising presentation when the first player responds to said advertisement, wherein said change to said different advertising presentation does not change an availability to subsequently perform game plays of said first instance.

11. The method as claimed in claim 10, wherein one or more of:

(a) said token representations are useful for playing one or more of the following games: blackjack, poker, pia gow, craps, and roulette;

(b) said game tokens include token representations of one or more of: cards, and dice.

12. The method as claimed in claim 1, wherein a presentation related to one of a product and a service is viewed while playing one of said game instances on a network, further including:

communicating with a server network node that provides network access to the game for playing using communications on said network;

playing one of said games using communications between a first player node and said server network node;

presenting a first presentation at said first player node, wherein said first presentation is presented between two plays of said one instance of the game and wherein said first presentation is capable of being replaced by a different second presentation without changing a play of said one instance;

detecting an action in response to said first presentation by a first of the players;

transmitting a data item indicative of said action to a second network node not contacted for the playing of the game with the first player;

conducting a network communication between the first player and the second network node, in response to said data item, for information related to the purchase of at least one of: a product and a service.

13. The method as claimed in claim 12, further including, in response to said step of detecting, a step of identifying a network address of the second network node without the first player inputting the network address.

14. The method as claimed in claim 1, wherein advertising is presented on the Internet during the playing of one of the tournaments, further including the steps of:

activating by an Internet accessible player node, available to a first of the players, an instance of an interactive service available at a first Internet accessible node via a first Internet connection;

first presenting a first presentation, via the Internet, to the first player at said player node, during Internet interactions between the first player and the service, wherein said first presentation identifies at least one of a purchasable product and a purchasable service; and wherein said first presentation is: unrequested by the player, and substantially unrelated to a performance of the service by the first player;

transmitting data, via an Internet communication, indicative of an action by the first player in response to said step of first presenting;

receiving, via the Internet, a second presentation for presenting to the first player, wherein said second presentation is determined using said data, said second presentation also identifying one of a purchasable product and a purchasable service; and second presenting to the first player said second presentation during the first Internet connection.

15. The method as claimed in claim 1, wherein advertising related information is provided while playing one of said tournaments on a communications network, further including the steps of:

contacting a game playing network node by a first of the players at a player network node;

initiating one of the instances of the game by the first player at the player network node, wherein the instance includes a plurality of player plays;

first receiving one or more advertising related presentations by the first player for presentation during a playing of the instance of the game, wherein for at least a duration of time between a pair of some of the first player plays, a first of said one or more advertising presentations is presented at the player network node, wherein said first advertising related presentation is not presented to the first player during the instance of the game between a different pair of some two of the first player plays, wherein at least one of said advertising related presentations is interactive and has network node identifying information for accessing an additional network node different from said game playing network node, said additional network node having an additional presentation responsive to a first player input to said at least one advertising related presentation;

transmitting for said at least one advertising related presentation, player response data to said additional network node, wherein said player response data is related to one or more responses by the first player to said at least one advertising related presentation;

second receiving by the player network node another advertising related presentation providing additional information about a product or service advertised in said at least one advertising related presentation.

16. The method as claimed in claim 1, wherein advertising is presented to the players on a network during one of the tournaments, further including:

for each of one or more of the players accessing the network, the following steps are performed:

first transmitting, from the player, a corresponding request for accessing a providing node of the network, said providing node provides at least a portion of the game, wherein said request has associated therewith a network address for identifying the providing node;

first receiving, from the providing node via the network, said one or more interactive game presentations for presenting on at least a portion of a display of a player node by which the player accesses the network, and wherein said interactive game presentations are interactive, via the network, between the player and said providing node;

first presenting, by the player node, concurrently with at least one of the interactive game presentations, a first advertising presentation for providing information related to one of a product and a service, wherein said first advertising presentation is received via the network from some node of the network, and displayed on at least a portion of said display;

second presenting, by the player node over time, one or more additional advertising presentations, each said additional advertising presentation for providing information related to one of a product and a service, wherein each of at least some of said additional advertising presentations is:

(a) received via the network from said some node, and
(b) displayed on at least a portion of said display without the player providing an input that causes said additional advertising presentation to be displayed;

second transmitting, via the network, data indicative of an action by the player in response to one of said first and said additional advertising presentations, wherein said data is transmitted:
  (i) from said player node, and
  (ii) to a destination node of the network, said destination node identified at said player node by a destination network address used for transmitting said data;

second receiving, via the network, another presentation for presenting to the player at said player node, wherein said another presentation is responsive to said step of second transmitting.

17. The method of claim 16, wherein one or more of:
(a) said step of second presenting includes periodically transmitting one of said additional advertising presentations to said network player node;
(b) said step of second presenting includes forcing a display of at least one of said additional advertising presentations to be exposed on said display;
(c) at least a portion of said network used in one of said steps first and second receiving and first and second transmitting includes the Internet;
(d) at least a portion of said network used in one of said steps of first and second receiving and first and second transmitting communicates using TCP/IP as a network protocol;
(e) said network providing node and said some network node are at a same Internet site;
(f) said step of second receiving includes receiving further information related to the product or service of the advertising presentation for which said action by the player is a response;
(g) said network address includes Internet addressing information for use in routing the request through the Internet to said network providing node;
(h) said step of second presenting includes presenting at least one of said additional advertising presentations concurrently with at least one of said interactive game presentations;
(i) said destination network address is used by a hyperlink for accessing said destination network node;
(j) further including a step of third presenting said another presentation on said network player node, wherein at least a portion of said display maintains a graphical format displayed prior to said step of third presenting;
(k) said destination network node is an Internet site for a sponsor of said advertising presentation to which said action by the player is responsive;
(l) said destination network node is an Internet site identical to one of: said network providing node, and said some network node.

18. The method of claim 16, wherein at least one of said steps of first and second presenting is in response to a communication: (a) from an Internet service provider connecting the user to the network, and (b) to said some network node so that said some network node transmits one or more of: said first advertising presentation, and said additional advertising presentations to the player node.

19. The method as claimed in claim 1, wherein advertising related information is provided while playing one of the tournaments on the Internet, further including the steps of:

contacting a game playing Internet site by a user at a user Internet station;

transmitting user identification information prior to the user playing an instance of the game, wherein said user identification information is used to identify additional personal information related to the user for use during at least one subsequent instance of the game;

initiating said at least one instance of the game by the user at the user Internet station, wherein said at least one instance includes a plurality of user plays;

first receiving, by the user, one or more advertising related presentations for presentation during a playing of said at least one instance of the game, wherein at least one of said advertising related presentations accesses Internet site identifying information for contacting an additional Internet site different from said game playing Internet site, said additional Internet site having an additional presentation responsive to input by the user to said at least one advertising related presentation;

transmitting, for said at least one advertising related presentation, user response data to said additional Internet site, wherein said user response data is indicative of one or more inputs by the user to said at least one advertising related presentation; and second receiving, by the user Internet station, another advertising related presentation providing additional information about a product or service advertised in said at least one advertising related presentation.

20. A method of playing a card game, comprising:
generating electronic card representations for playing the card game;

receiving player identification information prior to at least a first player playing the card game wherein said identification information is used to identify additional information related to the first player for use in subsequent instances of the card game;

first playing a first instance of the card game between the first player and a substantially electronic game playing module, wherein said game playing module is dealt a first sequence of said card representations;

second playing a second instance of the game between a second player and said game playing module, wherein said first and second card game instances overlap in time and wherein said game playing module is dealt a second sequence of card representations for playing said second instance of the card game;

wherein said first and second sequences dealt to the game playing module have at least different card representations in at least one identical card representation position, in each of said first and second sequences.

21. A method of playing a card game as claimed in claim 20, further including using a result from a completion of said first instance in determining an acceptability of a play by the first user in a third instance of the card game subsequent to said first instance.

22. A method as claimed in claim 21, wherein said step of using includes comparing a requested wager by the first user with an acceptable wager limit, wherein said wager limit is dependent on results from previous instances of the card game played by the first user.

23. A method of playing a card game as claimed in claim 22, further including a step of providing consideration in order to play the card game.

24. A method of playing a card game as claimed in claim 23, wherein said step of providing consideration includes registering at an Internet web site.

25. A method of playing a card game as claimed in claim 20, wherein said step of receiving includes providing data related to one or more of: an age, a sex, a financial status, a location of residence, e-mail address, an educational level, a marital status, an amount of recreational time, a personal taste, a personal habit, size of household, a number of children.

26. A method as claimed in claim 20, wherein said game playing module communicates said card representations via a communications network.

27. A method of playing a card game as claimed in claim 20, wherein advertising is displayed via the communications network to at least one of said first and second users.

28. A method as claimed in claim 20, wherein said game playing module is accessible from an Internet web site and said first and second players play the card game with said game playing module using differently addressed Internet nodes for accessing said web site.

29. A method as claimed in claim 20, wherein said card representations provided to the first player in said first game instance are interspersed between card representations from said first sequence provided in said first game to said game playing module.

30. A method as claimed in claim 20, wherein card representations provided to the second player in said second game instance are interspersed between card representations from said first sequence.

31. A method as claimed in claim 20, wherein card representations provided to the first player are not played by said second player.

32. A method as claimed in claim 20, wherein a probability of said first and second sequences having identical card representations is substantially equal to chance.

33. A method as claimed in claim 20, wherein said step of first playing includes a plurality of requests by said first player for card representations prior to said step of second playing commencing.

34. A method as claimed in claim 33, wherein said step of generating includes outputting a different substantially random card representation when a card representation is provided.

35. A method as claimed in claim 20, wherein said step of generating includes providing, after a predetermined time interval, a next one of said card representations as a card representation eligible for play.

36. A method as claimed in claim 35, wherein said predetermined time interval is less than approximately two seconds.

37. A method as claimed in claim 20, wherein said receiving step includes a step of receiving an encoding of a player identification from a player identification input device for the first player.

38. A method as claimed in claim 37, wherein said step of receiving an encoding includes supplying player identification provided on a storage medium that can be electronically read.

39. A method of playing a card game as claimed in claim 20, further including a step of providing consideration in order to play the card game.

40. A method of playing a card game as claimed in claim 39, wherein said step of providing consideration includes registering at an Internet web site.

41. A method of playing a card game as claimed in claim 20, wherein said step of receiving includes providing data related to one or more of: an age, a sex, a financial status, a location of residence, e-mail address, an educational level, a marital status, an amount of recreational time, a personal taste, a personal habit, size of household, a number of children.

42. The method of any one of the claims 20, wherein for substantially every play of said first instance by the first player, there is a corresponding transmission on a communications network between said game playing module and said first player, wherein said corresponding transmission occurs prior to a subsequent game play by the first user within said first instance.

43. A method of playing a card game electronically, comprising:

generating one or more card representations for playing the card game;

first playing a first instance of the card game between a first player and a game playing module, wherein the first player receives a first sequence of card representations;

second playing a second instance of the card game between a second player and the game playing module, wherein said first and second card game instances overlap in time, and wherein the second player receives a second sequence of card representations;

wherein, for an initial series of one or more plays by said first player using said first sequence, when said second player also initially plays said initial series of one or more identical plays using said second sequence, then for corresponding identical plays by said first and second players, their corresponding hands of card representations are identical; and wherein for substantially every play of said first instance by the first player, there is a corresponding transmission on a communications network between said game playing module and said first player, wherein said corresponding transmission occurs prior to a subsequent game play by the first user within said first instance.

44. A method as claimed in claim 43, wherein said first and second players are playing in a same card game tournament.

45. A method as claimed in claim 43, wherein a card hand for the game playing module when playing with the first player and a card hand for the game playing module when playing with the second player are identical for each play of said initial series of plays played by the first and second players.

46. A method as claimed in claim 43, wherein said step of first playing includes reading an identification card with a card reader for identifying the first player.

47. A method as claimed in claim 43, wherein assuming said second player also initially plays said initial series, for each play of said initial series of one or more identical plays, a card hand for the game playing module when playing with the first player is identical to a corresponding card hand for the game playing module when playing with the second player.

48. A method as claimed in claim 43, wherein different card hands for said first and second players are a result of a different play by said first and second players.

49. A method as claimed in claim 43, wherein said step of first playing occurs in a casino.

50. A method of playing a card game, comprising:

receiving at a destination node, via a communications network, player identification information prior to at least a first player playing the card game, wherein an address for the destination node is used by the first player for transmitting said player identification information to said destination node;

generating card representations for playing said card game with at least the first player and a second player, wherein the first and second players obtain card representations via transmissions from a common address of a communications network;

first transmitting of plays to a first player in a first game of said card game, wherein a first collection of one or more of said card representations is transmitted to the first player through the communications network;

second transmitting of plays to a second player in a second game of said card game, wherein a second collection of one or more of the card representations is transmitted to the second player through the communications network;

wherein said first and second collections are transmitted to said first and second players during an overlapping time period;

ceasing to transmit card representations to the first player before said first game is completed;

continuing to transmit card representations to the second player after said step of ceasing;

terminating the playing of said second game with the second player;

subsequently continuing to transmit one or more card representations to the first player, to play said first game in response to the first player requesting an additional collection of one or more card representations;

commencing to transmit card representations to the second player for playing a third game of said card game, wherein a third collection of one or more card representations is transmitted to the second player and wherein the transmissions of the card representations for said additional collection and said third collection overlap in time.

51. A method as claimed in claim 50, wherein said communications network provides card representations to at least the first player, via the Internet, from a card providing Internet accessible node, wherein the following additional steps are included:

transmitting, via the Internet, from the card providing Internet accessible node, first information related to communications between (a) the card providing Internet accessible node, and (b) a first Internet accessible node from which the first player communicates with the card providing Internet accessible node;

wherein said first information is capable of being used in subsequent Internet communications between the card providing Internet accessible node and the first Internet accessible node;

causing said first information to be stored on the first Internet accessible node so that it is available in subsequent different Internet connections by the first player.

52. A method as claimed in claim 51, wherein said first information is a program for receiving advertisement information from said card providing Internet accessible node.

53. The method of claim 51 further including a step of receiving, via the Internet, at the card providing Internet accessible node, second information indicative of said first information being present on said first Internet accessible node when said first player has disconnected the first Internet accessible node from the Internet and subsequently reconnected to the Internet.

54. A method as claimed in claim 53, further including a step of maintaining a status of each of said first and second games so that each of said first and second games are played with a same effect as if the other of said first and second games were not being played.

55. A method as claimed in claim 50, wherein said step of generating is performed by a card representation generating module for supplying card representations to both the first and second players.

56. A method as claimed in claim 50, wherein said card game is blackjack.

57. A method as claimed in claim 56, further including a step of receiving a request from the first player to stand and a request from the second player for a hit, when the first and second players are provided with a same card representation for their respective blackjack card hands.

58. A method as claimed in claim 56, further including a step of playing a dealer's blackjack hand in each of said first and second games, wherein one of said card representations dealt to the first player in said first game is also dealt to the dealer's blackjack hand in said second game.

59. The method as claimed in claim 50, wherein said step of ceasing is for a time period determined by the first player, and wherein at least one of: (a) during said step of ceasing a card representation that is available for transmission to the first player becomes unavailable; and (b) said step of continuing does not change a sequence of card representations received by any other player receiving one or more generated card representations.

60. A method as claimed in claim 59, wherein said step of first transmitting includes transmitting from one of: a World Wide Web server and an Internet interface.

61. A method as claimed in claim 50, further including repeatedly performing the following steps:

determining, for at least one of said first and second players, a corresponding opponent's play that is responsive to a play made by the at least one player, and presenting, via a transmission on the communications network, a presentation of the corresponding opponent's play to the at least one player.

62. A method as claimed in claim 61, wherein for the at least one player, said corresponding opponent's play is a dealer's play.

63. A method as claimed in claim 61, wherein said opponent's play is determined without manual intervention during said opponent's play.

64. A method as claimed in claim 61, wherein said step of presenting includes combining said representation of the corresponding opponent's play with an advertising presentation for presentation to the at least one player.

65. A method as claimed in claim 64, wherein said step of combining includes choosing the advertising presentation using personal information supplied by the at least one player.

66. A method as claimed in claim 65, wherein said personal information includes one or more of: a name, an address, an e-mail address, an age, a sex, a financial status, a location of residence, a marital status, a size of household, a number of children, an educational level, an amount of recreational time, personal tastes, personal habits, and information related to interactions on the communications network.

67. A method as claimed in claim 64, wherein said step of combining includes determining a first advertising presentation for said first player and a different second advertising presentation for said second player in at least one situation.

68. A method as claimed in claim 50, wherein at least one of said card representations is selectable by one of:

(a) at most one of said first and second players, and (b) each player during a predetermined time period that said at least one card representation is provided as eligible for play.

69. A method as claimed in claim 68, wherein each said predetermined time is less than approximately two seconds.

70. A method as claimed in claim 50, wherein for a first card representation of said first collection, there is a corresponding identical second card representation in said second collection, wherein the first card representation and the corresponding second card representation are obtained from a same generated card representation.

71. A method as claimed in claim 50, wherein an address of a node providing access to the network for at least one of said first and second players is different from said common address.

72. A method as claimed in claim 50, further including a step of communicating electronically card game information between a module for generating said card representations and said first player playing said first game, wherein the first and second steps of transmitting transmit via a same local area network that connects to a first game playing node used by the first player, and a second game playing node used by the second player.

73. A method as claimed in claim 50, wherein said step of generating includes repeatedly providing a substantially random card representation, wherein each said substantially random card representation is eligible for play for one of:

(a) a corresponding predetermined time period, and (b) at most one of said first and second players.

74. A method as claimed in claim 50, further including a step of receiving an encoding of a player identification from a player identification input device for the first player before commencing said first game, said player identification device receives said encoding from an identification card.

75. A method as claimed in claim 50, further including a step of changing a time limit for accepting an input from said first player when said first player desires to change a speed of said first game.

76. A method as claimed in claim 50, further including a step of providing a ranking of players of said card game in response to a request from said first player for information related to a ranking of said first player in comparison to other players playing said card game.

77. A method as claimed in claim 50, wherein said step of first playing includes inputting, by said first player, a request for one of said card representations, wherein said request is transmitted using a connection to the Internet that is provided at one of: a reduced charge, and free of charge.

78. A method as claimed in claim 50, wherein said step of first playing includes storing a current configuration of said first game, wherein said current configuration is accessible using player identification data provided with each request for wagering by said first player.

79. A method as claimed in claim 50, further including a step of determining whether a wager by said first player is acceptable.

80. A method as claimed in claim 50, further including a step of communicating: (a) interactive advertising, and (b) gaming information related to said card game from a site for distributing said gaming information to said first player;

wherein said step of communicating is performed using one of Internet transmissions, cable television transmissions, and local area network transmissions.

81. A method of playing a game on the Internet, comprising:

first receiving player identification at a game playing Internet accessible node (GPIAN) for first and second players;

transmitting, via the Internet, from the GPIAN, first information related to communications between: (a) the GPIAN, and (b) a first Internet accessible node from which the first player communicates with the GPIAN;

wherein said first information is utilized in subsequent Internet communications between the GPIAN and the first Internet accessible node;

causing said first information to be stored on the first Internet accessible node so that it is available in subsequent different Internet connections by the first player;

second receiving, via the Internet, at the GPIAN, first responsive information indicative of said first information being present on said first Internet accessible node;

first playing with the first player a first game, wherein one or more game play representations are transmitted to the first player via the first Internet accessible node;

second playing with the second player a second game, wherein one or more game play representations are transmitted to the second player and from the GPIAN while the first player is playing the first game;

playing of a third game between said GPIAN and the second player, wherein a third collection of one or more game play representations is transmitted to the second player, and wherein the transmissions of the game play representations for the third collection and the first collection overlap in time;

wherein said step of second receiving at the GPIAN occurs when the first player has reconnected the first Internet accessible node to the Internet after said first information has been stored on the first Internet accessible node and said first Internet accessible node has disconnected from the Internet.

82. A method as claimed in claim 81, further including a step of providing the first player with a game play ranking of the second player.

83. A method of playing a card game, comprising:

generating card representations for playing said card game;

first playing, by a first player in a first game of said card game, a first collection of one or more of said card representations transmitted through a communications network;

changing a time limit for accepting an input from said first player when said first player desires to change a speed of said first game.

84. A method as claimed in claim 83, further including a step of second playing, by a second player in a second game of said card game, a second collection of one or more of said card representations transmitted through the communication network;

wherein said first and second games overlap in time.

85. A method as claimed in claim 84, further including a step of providing the first player with a game play ranking of the second player, said ranking dependent upon an outcome of a plurality of games of said card game played by the second player.

86. A method as claimed in claim 84, further including:

receiving a request for terminating, by the second player, said second game;

continuing to receive, from the first player, responses to play said first game by requesting one or more of said card representations;

commencing, by the second player, to play a third game of said card game, wherein a third collection of one or more of said card representations is received by the second player and wherein reception of said card representations for said additional collection and said third collection overlap in time.

87. A method of playing a game on a communications network, comprising:
   receiving, at a game playing node of the network, a request for selecting a pace of play of an instance of the game by a first user at a first node of the network;
   first transmitting game plays between said game playing node and the first user using network communications between the game playing node and the first node, wherein at least a second user has played an instance of the game; and
   transmitting to the first node a ranking of said second user, wherein the ranking is indicative of a proficiency of the second user in playing the game.

88. A method as claimed in claim 87, wherein said step of transmitting includes receiving a request from the first player for viewing the ranking.

89. A method as claimed in claim 87, wherein the game includes at least one of the following attributes:
   (a) an element of chance;
   (b) a total number of possible game plays, is capable of being determined before playing the game; and
   (c) there is an opponent to at least one of the users.

90. A method as claimed in claim 87, wherein said step of receiving includes changing the pace of play during the instance of the game.

91. A method of playing a card game, comprising:
   receiving player identification information prior to at least a first player playing the card game;
   generating card representations for playing said card game with at least the first player and a second player, wherein the first and second players obtain card representations from a source node of a communications network accessed by a common communications network address;
   first playing, with a first player in a first game of said card game, wherein a first collection of one or more of said card representations is transmitted to the first player;
   second playing, with a second player in a second game of said card game, wherein a second collection of one or more card representations is transmitted to the second player, wherein said first and second card representation collections are transmitted to said first and second players during an overlapping time period;
   terminating the playing of said second game with the second player;
   commencing to transmit card representations to the second player for playing a third game of said card game, wherein a third collection of one or more card representations is transmitted to the second player during said third game, and wherein the transmissions of the card representations for said first collection for playing said first game, and said third collection for playing said third game overlap in time.

92. A method of playing a game on a communications network, comprising:
   receiving at a game playing node on the network, a contact by each of a plurality of users, via a corresponding node on the network for the user, for initiating a corresponding instance of the game between the game playing node and the user's corresponding node, and at least some of said instances overlap in time;
   transmitting game plays between said game playing node and a first of the users, for the corresponding instance of the game;
   transmitting from the game playing node to the corresponding node of the first user, the ranking of a second of the users, wherein said ranking is indicative of a proficiency of the second user in playing the game, and said ranking is updated to present a change in said ranking while the first user is playing the game.

93. A method as claimed in claim 92, further including a step of receiving, at the game playing node, from the first user via the corresponding network node, a request for a ranking of the second user.

94. A method of playing a game on a communications network, comprising:
   first receiving, from each of a plurality of users via a corresponding node for the user on the network, a contact at a game playing node on the network, so that each of the users initiates a corresponding instance of the game between the game playing node and the user's corresponding node, and at least some of said instances overlap in time;
   second receiving, at the game playing network node from a first of the users via the first user's corresponding network node, a request for selecting a pace of play of the corresponding game instance;
   playing, by the first user, the corresponding instance of the game with the game playing node at the pace selected by the first user.

95. An apparatus for playing a game on a network, comprising:
   a display area for electronically displaying an instance of the game to a first user;
   an input area for allowing the first user to input a game play;
   a communications network connection for communicating, on a network, game related information, between: (a) one or more of said display and said input area, and (b) an addressable node on said network accessible by a network address available to said apparatus;
   wherein a plurality of users communicate with said addressable node for playing instances of the game; and
   wherein between at least a majority of game plays by the first user, there is a game play related network transmission via said communications connection; and
   a game speed of play control for allowing the first user to control the pace of the instance of the game.

96. An apparatus as claimed in claim 95, wherein said game speed of play control is capable of reducing and increasing an allotted time within which the first user must input a game play.

97. An apparatus as claimed in claim 95, further including a card reader, wherein when an identification card for identifying the first user is inserted therein, data identifying the user is communicated to the game controller.

98. An apparatus as claimed in claim 95, wherein said input area includes a control that allows the first user to reject a game play previously entered into said apparatus by the first user.

99. An apparatus as claimed in claim 95, wherein said display area includes one or more of the following:
   (a) a current state of the instance of the game;
   (b) a current state of a game tournament being played, wherein said game tournament includes a plurality of users each playing a plurality of instances of the game;
   (c) a description of rules for the game; and
   (d) an identifier for identifying the first user.

100. An apparatus as claimed in claim 95, wherein said input area includes one or more controls for entering a wager.

101. An apparatus as claimed in claim 95, wherein said game is blackjack.

102. An apparatus for playing a game on a network, comprising:
- a display area for electronically displaying an instance of the game;
- an input area for allowing a first user to input a game play for said instance of the game;
- a communications network connection for communicating game related information between said apparatus and a game controller, wherein said game controller communicates with said apparatus via a network, said network also connected to additional network nodes for allowing simultaneous play of instances of the game with the game controller by a plurality of users;
- a control for allowing the first user to cancel a previously entered wager;
- a card reader, wherein when an identification card identifying the first user is provided thereto, data identifying the first user is communicated to the game controller.

103. An apparatus for playing a card game electronically, comprising:
- a card generator for generating one or more electronic card representations for playing the card game;
- a game playing engine for playing a first electronic instance of the card game between a first player and a substantially electronic dealer module, wherein the first player is dealt a first sequence of the card representations, and wherein a second player plays a second instance of the card game with the dealer module so that said first and second card game instances overlap in time, and wherein the second player receives a second sequence of the card representations; and wherein, for an initial series of one or more plays by said first player using said first sequence, when said second player also initially plays said initial series of one or more identical plays using said second sequence, then for corresponding identical plays by said first and second players, their corresponding hands of card representations are identical.

104. An apparatus for playing a card game electronically, comprising:
- a card generator for generating card representations for playing said card game electronically;
- a game playing engine for playing said card game with a plurality of players simultaneously, wherein said game playing engine transmits, for each player, a corresponding collection of one or more of said card representations through a communications network to the player;
- a timer in operative communication with said game playing engine for changing a time limit for accepting an input from a first of said players when said first player transmits a communications network request to change a speed of play of said game.

105. The apparatus of claim 104, further including a means for changing a speed of play for the first player without changing a speed of play for a second of said players, wherein the first and second players are playing the same game simultaneously.

* * * * *

UNITED STATES PATENT AND TRADEMARK OFFICE
CERTIFICATE OF CORRECTION

PATENT NO. : 6,264,560 B1  
DATED : July 24, 2001  
INVENTOR(S) : Goldberg et al.

Page 1 of 1

It is certified that error appears in the above-identified patent and that said Letters Patent is hereby corrected as shown below:

Title page,  
References Cited, please delete "5,716,574" and insert -- 5,713,574 -- as it was cited in an Information Disclosure Statement filed December 7, 1999.

Column 8,  
Line 8, please delete "gaming stations" and insert -- gaming stations 18. -- therein.

Column 31,  
Line 44, please delete "tournaments." and insert -- tournament(s). -- therein.

Signed and Sealed this

Second Day of April, 2002

*Attest:*

JAMES E. ROGAN  
*Attesting Officer*     *Director of the United States Patent and Trademark Office*